US009961750B2

(12) United States Patent
Leinen et al.

(10) Patent No.: US 9,961,750 B2
(45) Date of Patent: May 1, 2018

(54) ADVANCED NETWORKED LIGHTING CONTROL SYSTEM INCLUDING IMPROVED SYSTEMS AND METHODS FOR AUTOMATED SELF-GROUPING OF LIGHTING FIXTURES

(71) Applicant: LEVITON MANUFACTURING CO., INC., Melville, NY (US)

(72) Inventors: Richard A. Leinen, Wilsonville, OR (US); Robert L. Hick, Newberg, OR (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days. days.

(21) Appl. No.: 15/439,012

(22) Filed: Feb. 22, 2017

(65) Prior Publication Data
US 2017/0245351 A1 Aug. 24, 2017

Related U.S. Application Data

(60) Provisional application No. 62/299,294, filed on Feb. 24, 2016.

(51) Int. Cl.
*H05B 37/00* (2006.01)
*H05B 37/02* (2006.01)
(Continued)

(52) U.S. Cl.
CPC ..... *H05B 37/0272* (2013.01); *H05B 33/0854* (2013.01); *H05B 37/0218* (2013.01); *H04W 4/008* (2013.01)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 6,909,921 B1 6/2005 Bilger
7,683,301 B2 3/2010 Papamichael et al.
(Continued)

FOREIGN PATENT DOCUMENTS

WO WO2014108771 A2 7/2014
WO 2015195645 A1 12/2015

OTHER PUBLICATIONS

International Search Report and Written Opinion for PCT/US2017/019011, dated Jun. 12, 2017, 8 pages.

*Primary Examiner* — Minh D A

(57) ABSTRACT

An advanced lighting control system including systems for commissioning a network of lighting fixtures preferably includes a plurality of lighting fixtures, each having a sensor and control module. The sensor and control module includes occupancy and light sensing elements, and a first transceiver. The lighting fixtures can send wireless signals to a second transceiver located in a room controller and/or a network coordinator. The room controller being configured to interpret the occupancy and light sensing information and make decisions thereon, while the network coordinator can rank the lighting fixtures according to a determined signal strength. The network coordinator can command each of the lighting fixtures to illuminate, and based on an observation of the lighting fixture, a determination is made about whether the lighting fixture is located in a particular room. The network coordinator can also include a third transceiver for receiving wireless commands from a remote device.

47 Claims, 14 Drawing Sheets

(51) Int. Cl.
*H05B 33/08* (2006.01)
*H04W 4/00* (2018.01)

(58) Field of Classification Search
CPC .. H05B 37/029; H05B 37/02; H05B 37/0254; H05B 33/0857; H05B 33/0863; H05B 33/0803; G07C 9/00309; G07C 2009/00793; G07C 2209/63; G07C 9/00111; B60R 25/24
See application file for complete search history.

(56) References Cited

U.S. PATENT DOCUMENTS

| | | | |
|---|---|---|---|
| 7,767,948 B2 | 8/2010 | May et al. | |
| 8,040,070 B2 | 10/2011 | Myers et al. | |
| 8,115,419 B2 | 2/2012 | Given et al. | |
| 8,138,690 B2 | 3/2012 | Chemel et al. | |
| 8,232,745 B2 | 7/2012 | Chemel et al. | |
| 8,305,014 B1 | 11/2012 | Li et al. | |
| 8,310,159 B2 | 11/2012 | Bigge et al. | |
| 8,339,069 B2 | 12/2012 | Chemel et al. | |
| 8,344,660 B2 | 1/2013 | Mohan et al. | |
| 8,368,321 B2 | 2/2013 | Chemel et al. | |
| 8,373,362 B2 | 2/2013 | Chemel et al. | |
| 8,457,793 B2 | 6/2013 | Golding et al. | |
| 8,461,778 B2 | 6/2013 | Mohan et al. | |
| 8,492,999 B2 | 7/2013 | Cheng | |
| 8,493,209 B2 | 7/2013 | Mohan et al. | |
| 8,508,149 B2 | 8/2013 | Mohan et al. | |
| 8,531,134 B2 | 9/2013 | Chemel et al. | |
| 8,536,802 B2 | 9/2013 | Chemel et al. | |
| 8,543,249 B2 | 9/2013 | Chemel et al. | |
| 8,552,664 B2 | 10/2013 | Chemel et al. | |
| 8,558,466 B2 | 10/2013 | Curasi et al. | |
| 8,587,219 B2 | 11/2013 | Mohan et al. | |
| 8,587,225 B2 | 11/2013 | Ashar et al. | |
| 8,593,135 B2 | 11/2013 | Chemel et al. | |
| 8,604,714 B2 | 12/2013 | Mohan et al. | |
| 8,610,376 B2 | 12/2013 | Chemel et al. | |
| 8,610,377 B2 | 12/2013 | Chemel et al. | |
| 8,669,716 B2 | 3/2014 | Recker et al. | |
| 8,680,789 B2 | 3/2014 | Mohan et al. | |
| 8,729,833 B2 | 5/2014 | Chemel et al. | |
| 8,754,589 B2 | 6/2014 | Chemel et al. | |
| 8,805,550 B2 | 8/2014 | Chemel et al. | |
| 8,816,851 B2 | 8/2014 | Mohan et al. | |
| 8,823,277 B2 | 9/2014 | Chemel et al. | |
| 8,826,046 B2 | 9/2014 | Lu et al. | |
| 8,829,821 B2 | 9/2014 | Chobot et al. | |
| 8,841,859 B2 | 9/2014 | Chemel et al. | |
| 8,866,408 B2 | 10/2014 | Chemel et al. | |
| 8,890,418 B2 | 11/2014 | Mohan et al. | |
| 8,909,380 B2 | 12/2014 | Golding et al. | |
| 8,912,735 B2 | 12/2014 | Chobot et al. | |
| 8,941,129 B1 | 1/2015 | Gershowitz et al. | |
| 8,954,170 B2 | 2/2015 | Chemel et al. | |
| 8,975,821 B2 | 3/2015 | Gershowitz et al. | |
| 8,975,827 B2 | 3/2015 | Chobot et al. | |
| 8,994,295 B2 | 3/2015 | Mohan et al. | |
| 9,002,522 B2 | 4/2015 | Mohan et al. | |
| 9,006,996 B2 | 4/2015 | Mohan et al. | |
| 9,014,829 B2 | 4/2015 | Chemel et al. | |
| 9,072,133 B2 | 6/2015 | Chemel et al. | |
| 9,078,305 B2 | 7/2015 | Pelton et al. | |
| 9,111,434 B2 | 8/2015 | Hohl et al. | |
| 9,125,254 B2 | 9/2015 | Chemel et al. | |
| 9,148,935 B2 | 9/2015 | Mohan et al. | |
| 9,155,165 B2 | 10/2015 | Chobot | |
| 9,155,166 B2 | 10/2015 | Chobot | |
| 9,188,997 B2 | 11/2015 | Mohan et al. | |
| 9,192,028 B2 | 11/2015 | Walma et al. | |
| 9,763,310 B2 * | 9/2017 | Dahlen | H05B 37/0245 |
| 9,832,848 B2 * | 11/2017 | Hidaka | H05B 37/0245 |
| 2010/0296285 A1 | 11/2010 | Chemel et al. | |
| 2012/0153844 A1 | 6/2012 | Chobot | |
| 2012/0235579 A1 | 9/2012 | Chemel et al. | |
| 2012/0326608 A1 | 12/2012 | Mohan et al. | |
| 2012/0328299 A1 | 12/2012 | Pickard et al. | |
| 2013/0010018 A1 | 1/2013 | Economy | |
| 2013/0026947 A1 | 1/2013 | Economy et al. | |
| 2013/0030589 A1 | 1/2013 | Pessina et al. | |
| 2013/0069543 A1 | 3/2013 | Mohan et al. | |
| 2013/0184892 A1 | 7/2013 | Mohan et al. | |
| 2013/0207552 A1 | 8/2013 | Plunk et al. | |
| 2013/0257284 A1 | 10/2013 | VanWagoner et al. | |
| 2013/0320859 A1 | 12/2013 | Mohan et al. | |
| 2013/0342111 A1 | 12/2013 | Mohan | |
| 2014/0001952 A1 | 1/2014 | Harris et al. | |
| 2014/0001959 A1 | 1/2014 | Motley et al. | |
| 2014/0001962 A1 | 1/2014 | Harris | |
| 2014/0001972 A1 | 1/2014 | Harris et al. | |
| 2014/0028200 A1 | 1/2014 | Van Wagoner et al. | |
| 2014/0031987 A1 | 1/2014 | Ericsson et al. | |
| 2014/0103819 A1 | 4/2014 | Mohan | |
| 2014/0125233 A1 | 5/2014 | Rietman et al. | |
| 2014/0139137 A1 | 5/2014 | Recker et al. | |
| 2014/0167620 A1 | 6/2014 | Chobot | |
| 2014/0167642 A1 | 6/2014 | Chobot | |
| 2014/0167653 A1 | 6/2014 | Chobot | |
| 2014/0175990 A1 | 6/2014 | Bhatkar et al. | |
| 2014/0197750 A1 | 7/2014 | Cash | |
| 2014/0210355 A1 | 7/2014 | Cash et al. | |
| 2014/0210364 A1 | 7/2014 | Cash et al. | |
| 2014/0222213 A1 | 8/2014 | Mohan et al. | |
| 2014/0225511 A1 | 8/2014 | Pickard et al. | |
| 2014/0235269 A1 | 8/2014 | Ericsson et al. | |
| 2014/0239808 A1 | 8/2014 | Nava et al. | |
| 2014/0239848 A1 | 8/2014 | Bradford | |
| 2014/0255038 A1 | 9/2014 | Richards | |
| 2014/0265922 A1 | 9/2014 | Gilliom et al. | |
| 2014/0265927 A1 | 9/2014 | Mohan et al. | |
| 2014/0268790 A1 | 9/2014 | Chobot et al. | |
| 2014/0270793 A1 | 9/2014 | Bradford | |
| 2014/0292208 A1 | 10/2014 | Chemel et al. | |
| 2014/0293605 A1 | 10/2014 | Chemel et al. | |
| 2014/0319320 A1 | 10/2014 | Akur Venkatesan | |
| 2014/0333222 A1 | 11/2014 | Chemel et al. | |
| 2014/0362669 A1 | 12/2014 | Mohan et al. | |
| 2015/0005951 A1 | 1/2015 | Srinivasan et al. | |
| 2015/0008827 A1 | 1/2015 | Carrigan et al. | |
| 2015/0008828 A1 | 1/2015 | Carrigan et al. | |
| 2015/0008831 A1 | 1/2015 | Carrigan et al. | |
| 2015/0015145 A1 | 1/2015 | Carrigan et al. | |
| 2015/0022088 A1 | 1/2015 | Gershowitz et al. | |
| 2015/0048758 A1 | 2/2015 | Carrigan et al. | |
| 2015/0054406 A1 | 2/2015 | Gershowitz et al. | |
| 2015/0061503 A1 | 3/2015 | Billard et al. | |
| 2015/0061511 A1 | 3/2015 | Chemel et al. | |
| 2015/0076993 A1 | 3/2015 | Mohan | |
| 2015/0102729 A1 | 4/2015 | Creasman et al. | |
| 2015/0127260 A1 | 5/2015 | Mullller et al. | |
| 2015/0137958 A1 | 5/2015 | Norlen et al. | |
| 2015/0138784 A1 | 5/2015 | Pratt et al. | |
| 2015/0145415 A1 | 5/2015 | Gershowitz et al. | |
| 2015/0145418 A1 | 5/2015 | Pope | |
| 2015/0163878 A1 | 6/2015 | Dixon | |
| 2015/0177716 A1 | 6/2015 | Hyman et al. | |
| 2015/0184842 A1 | 7/2015 | Chemel et al. | |
| 2015/0189068 A1 | 7/2015 | Mohan et al. | |
| 2015/0195883 A1 | 7/2015 | Harris et al. | |
| 2015/0216017 A1 | 7/2015 | Pratt et al. | |
| 2015/0223309 A1 | 8/2015 | Mohan et al. | |
| 2015/0250042 A1 | 9/2015 | Aggarwal et al. | |
| 2016/0021723 A1 | 1/2016 | Huizenga et al. | |

* cited by examiner

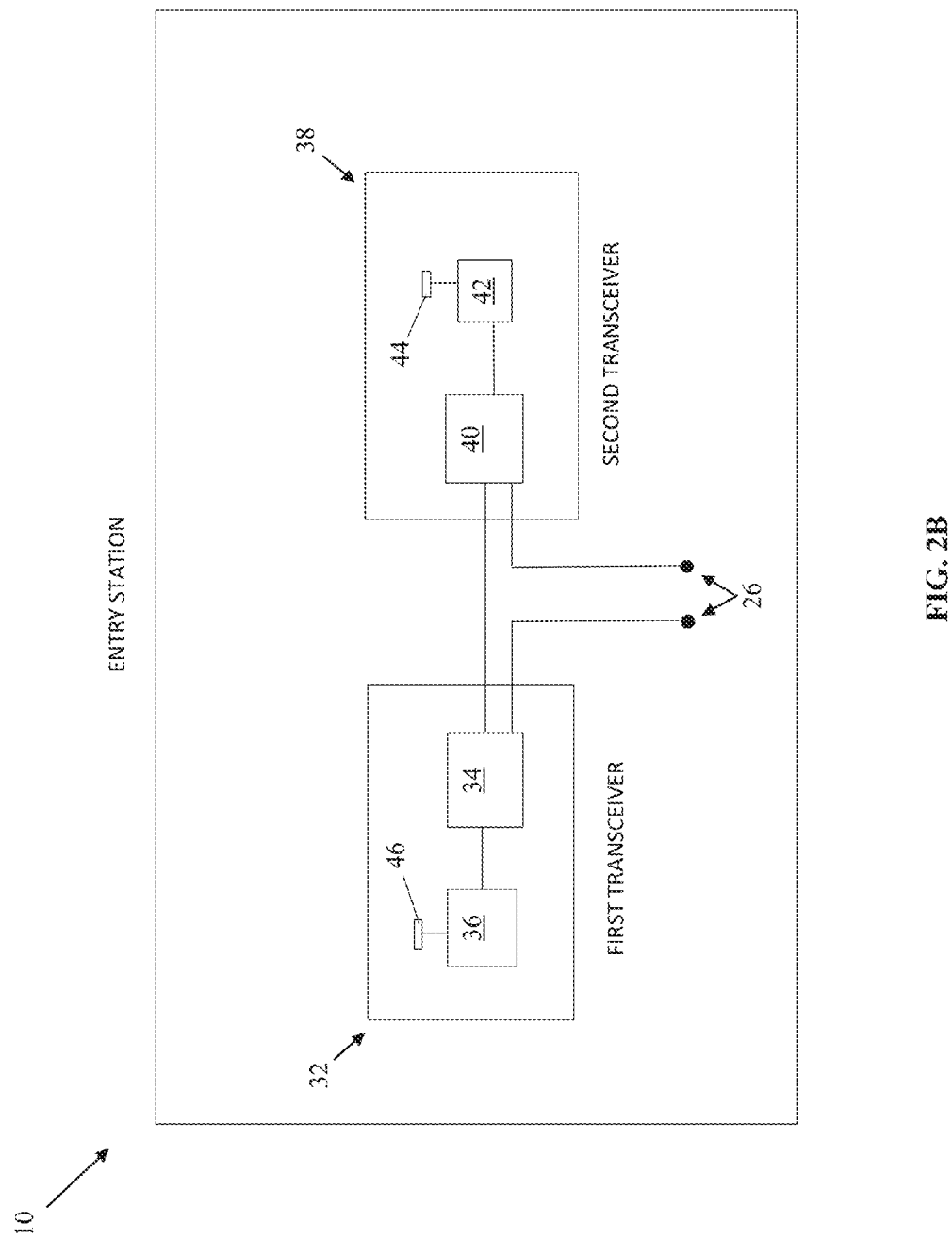

ADVANCED NETWORKED LIGHTING CONTROL SYSTEM INCLUDING IMPROVED SYSTEMS AND METHODS FOR AUTOMATED SELF-GROUPING OF LIGHTING FIXTURES

CROSS-REFERENCE TO RELATED APPLICATIONS

This application is a non-provisional of pending U.S. Provisional Patent Application Ser. No. 62/299,294, filed Feb. 24, 2016, titled "Advanced Networked Lighting Control System Including Improved Systems and Methods for Automated Self-Grouping of Lighting Fixtures" the entirety of which application is incorporated by reference herein.

FIELD OF THE DISCLOSURE

The present disclosure relates generally to lighting control systems, and more particularly to an advanced networked lighting control system including an improved system and method for automated grouping of the lighting fixtures in the networked lighting control system.

BACKGROUND OF THE DISCLOSURE

During the installation and commissioning of a networked lighting control system, setup, discovery, address assignment, location identification, and the like, consume significant amounts of time and manual work. For example, in many cases a commissioning agent must identify the various lighting fixtures on a floor plan, and must manually set up a unique address for each lighting fixture or group of lighting fixtures, often by setting DIP switches on each lighting fixture.

During installation, a commissioning agent may use a paper floor plan to mark lighting fixture locations with their respective addresses and may use this information to group the fixtures into their respective control locations. For example, fixtures in a particular room may need to be manually grouped so that they can be controlled as a unit, or an occupancy sensor may need to be manually grouped with the fixtures it controls. This process tends to be very labor intensive and is also prone to mistakes. Moreover, it is time consuming to add additional fixtures to an existing floor plan after the initial commissioning is completed.

Testing and troubleshooting fixtures in a lighting control network is also time consuming often involving a significant amount of manual labor. Commissioning agents often need to identify the fixture(s) in a specific room through building layout documents, then walk to the room and trouble shoot the devices in that room. Adding to the complexity is that the master (central) controllers are often located in electrical closets or behind ceilings, and it is often necessary to connect a user input to the master controller which, in turn, requires accessing and opening the master controller to connect the user input thereto.

It would therefore be desirable to provide an improved networked lighting control system that includes improved systems and methods for identifying and grouping fixtures into the lighting control system to minimize manual inputs, and to reduce or eliminate grouping errors.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein are improved advanced lighting control systems and methods for automated detecting and grouping lighting fixtures into a networked lighting control system. As such, the systems and methods preferably are implemented in a manner that reduces or minimizes the need for user interaction. The systems and methods preferably include a plurality of lighting fixtures, each having a sensor and control module. Each sensor and control module may include occupancy and light sensing elements, and a first transceiver. The lighting fixtures preferably transmit wireless signals to a second transceiver located in a room controller and/or a network coordinator. The room controller being configured to interpret the received occupancy and light sensing information and make decisions thereon, while the network coordinator may be able to identify all nearby suitable nodes, and group the nearby nodes into a networked lighting group. The network coordinator may be able to rank the lighting fixtures according to a determined signal strength. The network coordinator may also be able to command each of the lighting fixtures to illuminate, and based on an observation of the lighting fixture, a determination is made about whether the lighting fixture is located in a particular room. The network coordinator may also include a third transceiver for receiving wireless commands from a remote device In one example embodiment, the lighting control system may include a room controller and a plurality of intelligent lighting fixtures, whereby each fixture is preferably integrated or associated with a power pack module, and a sensor and control module. For example, the sensor and control module, and the power pack module may be integrated into the housing of the fixture. Alternatively, the sensor and control module may be mounted in the ceiling alongside the fixture, while the power pack may be integrated into or associated with the fixture above the ceiling. Communications between the sensor and control module, and the power pack module may be via a serial cable.

The room controller may be incorporated into an entry station that includes one or more user accessible interfaces (e.g., buttons, slides, etc.) for receiving user instructions. Each lighting fixture preferably includes an occupancy sensor and a light sensing element (e.g., a photocell) for collecting information on the room's occupancy and ambient light level, respectively. This information may be transmitted to the sensor and control module. Using a processor and a transceiver located in the sensor and control module, the information may be transmitted to the room controller. The room controller is preferably responsible for collecting all sensor information from all fixtures in the networked lighting group and any information from user interaction with the one or more entry stations. Based on all of the information received, the room controller preferably determines what actions are needed and transmits control signals to the sensor and control modules in the respective fixtures. Based on the control signal received, the sensor and control module may instruct the lighting fixture to TURN ON, TURN OFF, DIM UP, or DIM DOWN the lights.

The lighting control system preferably also incorporates one or more wireless communication links. For example, one or more wireless communication chips or technology may be integrated into the sensor and control module, room controller, etc. The wireless communication system preferably enables wireless communications between the various lighting fixtures and the room controller and/or network coordinator. In addition, additional wireless communications may be incorporated into the room controller and/or network coordinator to facilitate wireless communications with a smart device (e.g., smartphone, tablet, laptop, etc.), to facilitate commissioning, configuration and support for the system.

In this manner, the plurality of lighting fixtures facilitates "out of the box" discovery and grouping of all of the lighting fixtures located within a particular room so that they can be controlled and configured as a single unit with little or no installer interaction.

In one example embodiment, the system for commissioning a network of lighting fixtures may include a plurality of lighting fixtures where each of the plurality of lighting fixtures including a lighting element; an identifier unique to each of said plurality of lighting fixtures; a sensor module associated with at least one of the lighting elements, the sensor module including an occupancy sensing element, a light sensing element and a first transceiver; and a network coordinator comprising a second transceiver. The network coordinator may be configured to discover, group and control a portion of the plurality of lighting fixtures by communicating with the first transceivers of each of the plurality of lighting fixtures. The network coordinator may also include a processor programmed to: receive, via the second wireless transceiver, respective wireless messages sent from each of the plurality of lighting fixtures, each of the respective wireless messages including the identifier associated with the respective lighting fixture; determine a respective signal strength associated with each of said respective wireless messages; and rank each of the plurality of lighting fixtures according to the determined signal strength.

The network coordinator may also include a third transceiver for receiving wireless messages from a remote device for controlling an operational function of the network coordinator.

In one example embodiment, the method for commissioning a networked lighting system may include sending, from a plurality of lighting fixtures, respective wireless messages to a network coordinator associated with an area, each of the respective wireless messages including an identifier associated with the respective lighting fixture; receiving, at the network coordinator, the respective wireless messages; determining, at the network coordinator, a respective signal strength associated with each of said respective wireless messages; ranking each of the plurality of lighting fixtures according to the determined signal strength; sending, from the network coordinator, a wireless message to a highest ranked one of said plurality of lighting fixtures, the wireless message instructing the highest ranked one to illuminate an associated lighting element; determining whether said illuminated lighting element is located within the area; and keeping the highest ranked one in a networked lighting group if said illuminated lighting element is determined to be located within the area, or removing the highest ranked one from said networked lighting group if said illuminated lighting element is determined not to be located within the area.

The method for commissioning a networked lighting system may also include activating an automated grouping process comprising: sending, from the network coordinator, a wireless message to the highest ranked one to turn off its associated lighting element; sending, from the network coordinator, a wireless message to a next lighting fixture, the wireless message instructing the next lighting fixture to illuminate an associated lighting element; determining whether said illuminated lighting element is located within the area by monitoring one or more light sensing elements in the one or more lighting fixtures in the networked lighting group for an increase in ambient light level in the area; and keeping the next lighting fixture in the networked lighting group if said illuminated lighting element is determined to be located within the area, or removing the next lighting fixture from said networked lighting group if said illuminated lighting element is determined not to be located within the area.

The present disclosure further discloses a number of methods for automating or partially automating discovering, grouping, commissioning, and controlling wirelessly enabled intelligent lighting fixtures.

BRIEF DESCRIPTION OF THE DRAWINGS

By way of example, a specific embodiment of the disclosed invention will now be described, with reference to the accompanying drawings, in which:

FIGS. 2A and 2B are schematic diagrams showing the placement and structure of an exemplary entry station according to the lighting system of FIG. 1;

DETAILED DESCRIPTION

Figure 1:
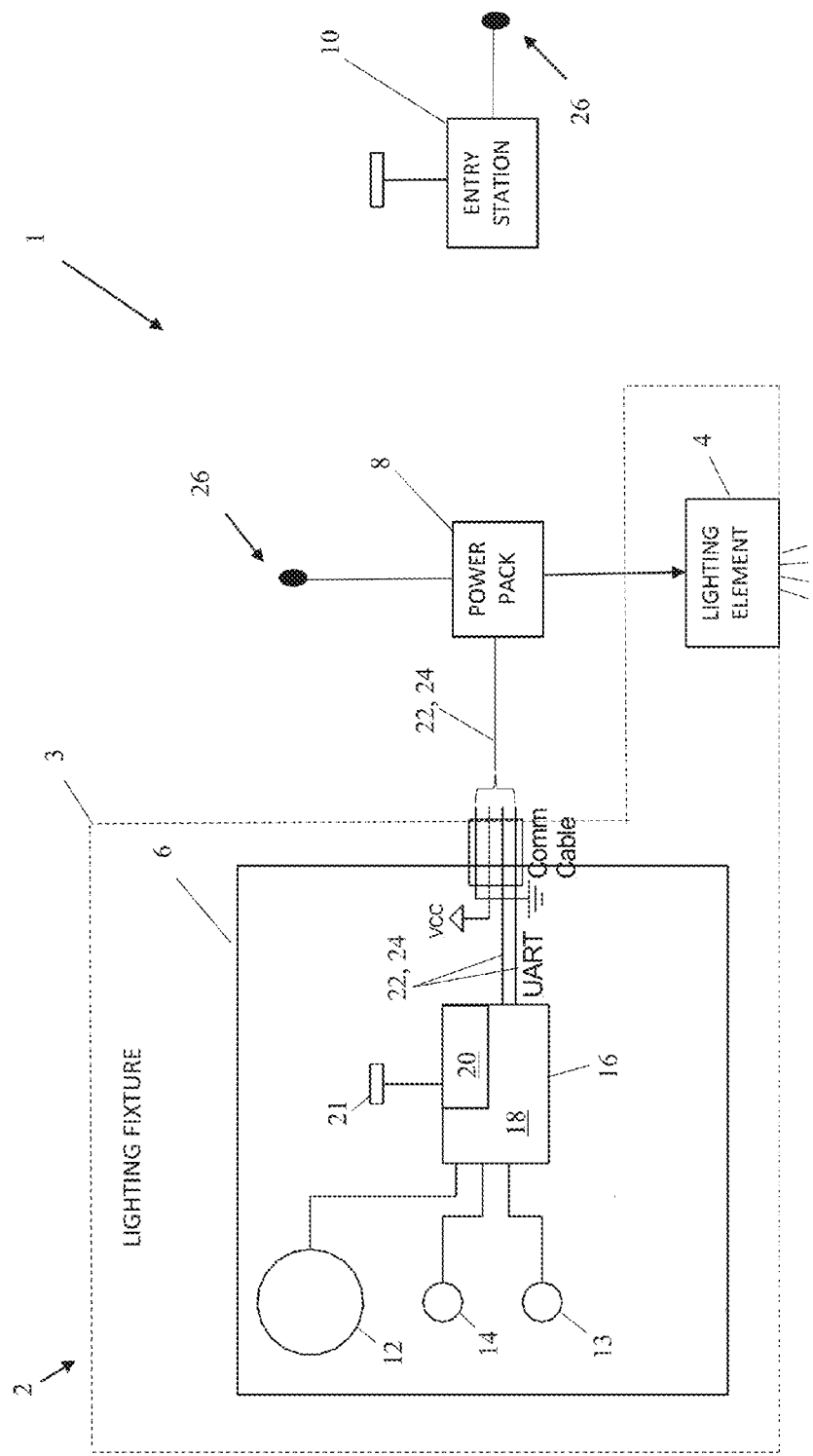
FIG. 1 is a schematic diagram of an exemplary lighting system according to a first preferred embodiment of the disclosure.

The present disclosure relates to an advanced networked lighting control system including improved systems and methods for automatically detecting and grouping wirelessly enabled lighting fixtures installed in commercial, residential or other spaces. Advantageously, the systems and methods for automatically detecting and grouping wirelessly enabled lighting fixtures may be implemented in a manner that reduces or minimizes the need for user interaction. As will be described, the disclosed systems and methods enable a network of lighting fixtures to be installed and integrated into a lighting control system in a more efficient and less manually intensive manner compared to present systems.

In a preferred embodiment, the lighting control system includes a room controller 10 and a plurality of intelligent lighting fixtures 2, whereby each fixture 2 is preferably integrated or associated with a power pack module and a sensor and control module. For example, the sensor and control module and the power pack module may be integrated into the housing of the fixture. This may be particularly useful where the fixture is a troffer or linear fixture. Alternatively, the sensor and control module may be mounted in the ceiling (e.g., a drop ceiling) alongside the fixture, while the power pack may be integrated into or associated with the fixture above the ceiling (e.g., the power pack may be mounted to an existing electrical box via a knock out). This may be particularly useful where the fixture is a recessed lighting fixture. Communications between the sensor and control module and the power pack module may be via a serial cable.

As will be described herein, in use, the room controller 10 is preferably incorporated into an entry station that includes one or more user accessible interfaces (e.g., buttons, slides, etc.) for receiving user instructions. Alternatively, the room controller and the entry station may be located in separate and distinct housings. For example, the entry station may be located adjacent an entrance 28 to a room while the room controller may be located within the ceiling or wall. More preferably, each lighting control system 1 includes a line powered entry station that incorporates the room controller functionality therein. Each lighting control system 1 may also include one or more battery powered entry stations (not shown) for placement within a room as required or desired. The battery powered entry stations preferably permit user interactions for turning the lights ON, OFF, and dimming control. The battery powered entry stations preferably also incorporate a wireless communications chip for communicating with the room controller or the line powered entry station with room controller functionality.

As will be described herein, in use, each lighting fixture preferably includes an occupancy sensor and a photocell for collecting information on the room's occupancy and ambient light level, respectively. This information is then transmitted to the sensor and control module. Using a processor and a transceiver located in the sensor and control module, the information is transmitted to the room controller. The room controller is preferably responsible for collecting all sensor information from all fixtures in the network and any information from user interaction with the one or more entry stations. Based on all of the information received, the room controller determines what actions are needed and transmits control signals to the sensor and control modules in the respective fixtures ("room controller functionality"). Based on the control signal received, the sensor and control module instructs the power pack to TURN ON, TURN OFF, DIM UP, or DIM DOWN the lights. Alternatively, it will be appreciated that the sensor and control module may be communicatively coupled to the lighting element directly, without the intervening power pack. For example, the sensor and control module may communicate directly with the lighting element driver or ballast. Alternatively, the sensor and control module may communicate directly with the lighting element. For example, the lighting element may be a Chip-On-Board ("COB") and the sensor and control module may communicate directly with the COB via an applicable communication protocol (e.g., DMX). Communicating directly with the lighting element or its associated driver or ballast eliminates the need for the intervening relay or power pack.

The lighting control system preferably also incorporates one or more wireless communication links. For example, one or more wireless communication chips or technology may be integrated into the sensor and control module, room controller, battery powered entry stations, or power pack. The wireless communication system preferably enables wireless communications between the various lighting fixtures and the room controller. In addition, the wireless communication system preferably enables wireless communications between the room controller and the battery powered entry stations. In addition, additional wireless communications may be incorporated into the room controller to facilitate wireless communications with a smart device (e.g., smartphone, tablet, laptop, etc.), to facilitate commissioning, configuration and support for the system. Such communications can be implemented with a personal area network (PAN) that functions in the ISM band at 2.4 GHz. Two examples of such PAN's are a wireless mesh network such as ZigBee®, Bluetooth® and particularly Bluetooth Low Energy (BLE). In one non-limiting exemplary embodiment the wireless communications between the various fixtures, room controller and battery powered entry stations can be accomplished via, for example, ZigBee®, Bluetooth® or BLE, while wireless communications between the room controller and the smart device can be accomplished via, for example, BLE.

As will be described in much greater detail below, a plurality of lighting fixtures may be installed in one or more rooms of a building. The disclosed systems and methods facilitate "out of the box" discovery and grouping of all of the lighting fixtures located within a particular room (a "targeted room") so that they can be controlled and configured as a single unit with little or no installer interaction.

As an initial step, the room controller, via a network coordinator, compiles a list of all adjacent lighting fixtures. This may be accomplished by any mechanism now known or hereafter developed. For example, in a ZigBee enabled system, the network coordinator may issue a join message. Any node (e.g., ZigBee enabled fixture or other ZigBee enabled device) that is not part of a network can transmit a wireless message to the network coordinator. Every transmitting node is then allowed to join the network. In this manner, a list of every ZigBee enabled device is compiled. In one particularly preferred embodiment, the fixtures can be preprogrammed to transmit a "beacon" or discovery signal for automatic discovery via the network coordinator disposed in, or associated with, the room controller. In this manner, once the system is installed, the room controller, via the network coordinator, can compile a listing of lighting fixtures based on the received beacon transmitted by each lighting fixture. Alternatively, the lighting fixtures may be configured to begin sending wireless activation signals to the network coordinator as soon as the lighting fixtures are powered up. In yet another embodiment, the lighting fixtures may be configured to begin sending wireless activation signals to the network coordinator when an associated occupancy sensor senses movement in the room in which the lighting fixture is installed. Using the occupancy sensor has the advantage of reducing the total number of nodes attempting to simultaneously transmit a wireless activation/discovery message. In still other embodiments, once the lighting fixtures are installed, an installer may instruct the room controller (preferably in the form of a line powered entry station) to transmit a wireless activation signal to some or all of the installed lighting fixtures. All of the lighting fixtures that receive the wireless activation signal can, in response, send a wireless acknowledgement signal back to the network coordinator disposed in, or associated with, the room controller. Based on the wireless signal (e.g., beacon, discovery, activation, acknowledgement, etc.), the network coordinator disposed in, or associated with, the room controller can compile a listing of lighting fixtures (including those inside and outside of the targeted room). In this way all of the lighting fixtures within range of the wireless signal can be automatically "discovered" by the room controller.

Next, the room controller can preferably determine which of the received signals (e.g., beacon, discovery, activation, acknowledgement, etc.) is the strongest, and presuming that the lighting fixture having the strongest signal (referred to as the "first lighting fixture") is located in the targeted room, the room controller may instruct that lighting fixture to illuminate its lighting element. For the purposes of the present disclosure it will be appreciated that a "lighting element" may include a light source and a driver or a light source with an integrated driver. An installer can then confirm that the first lighting fixture is in fact located in the targeted room, as described in greater detail below, this can be accomplished by any mechanism now known or hereafter developed including, using a smart device to transmit a wireless communication signal to the room controller, via a button or key press at the entry station, via a flashlight, etc.

In some embodiments, instructing a lighting fixture to illuminate its lighting element may include instructing the lighting fixture to cycle its lighting element through a series of on and off cycles to enable the system or user to distinguish between light coming from the lighting element and light from other sources such as natural sun light. Alternatively, the lighting fixture can DIM UP and DIM DOWN its lighting element.

Thereafter, the room controller can instruct each of the lighting fixtures, in sequence, to turn their lighting elements on and off. The other lighting fixtures, by way of a light sensing element such as a photocell, preferably located within the sensor and control module, can monitor for an increase ambient light level detection. Thus, when each of the lighting fixtures turns its lighting element on, the light sensing element may sense a boost in ambient light level (assuming the lighting fixture/lighting element are in the targeted room). If an increase in ambient light level is sensed by any other fixtures already determined to be in the room and part of the network when a particular lighting fixture turns its lighting element on, then the sensing fixture can send an appropriate wireless message to the room controller, and the lighting fixture illuminating its lighting element may automatically be kept by the associated network coordinator in the group associated with the targeted room. If no increase in ambient light level is detected when a particular lighting fixture turns its lighting element on, then no wireless message will be sent to the room controller and after a predetermined period of time or a timeout period, the lighting fixture may be removed from the group. Alternatively, in some embodiments, if no increase in ambient light level is detected when a particular lighting fixture turns its lighting element on, then at least one of the other fixtures already determined to be in the room can send an appropriate wireless message to the room controller, and the lighting fixture illuminating its lighting element may be removed from the group. Moreover, in an alternate preferred embodiment, if no increase in ambient light level is detected when a particular lighting fixture turns its lighting element on, the lighting fixture may be "flagged". At the end of the commissioning process, every flagged fixture can be instructed again to turn its lighting element on. If an increase in ambient light level is sensed by any other fixtures already determined to be in the room and part of the network when the flagged lighting fixture turns its lighting element on, then the sensing fixture can send an appropriate wireless message to the room controller, and the flagged lighting fixture may automatically be kept by the associated network coordinator in the group associated with the targeted room. If no increase in ambient light level is detected when the flagged lighting fixture turns its lighting element on, then no wireless message will be sent to the room controller and after a predetermined period of time or a timeout period, the lighting fixture may be removed from the group. The process of flagging a fixture prior to removing the fixture from group may be repeated as often as desired.

This process may continue until all lighting fixtures on the ranked list have been turned on and off individually. Those lighting fixtures deemed to be in the targeted room are grouped together for purposes of operational control. For example, a single wall switch, dimmer switch or other controller can operate all of the lighting fixtures in the group together. Once a room group is established, zones can be formed based on a variety of parameters, such as the amount of ambient light detected. For example, devices close to a window may sense, via their associated light sensing elements, a higher light intensity compared to devices mounted away from the window. The room controller can use this information to group the "higher intensity" devices into one or more zones to which separate daylighting protocols can be applied.

Referring now to FIG. 1, an embodiment of the disclosed lighting control system 1 preferably includes a lighting fixture 2 having a housing 3 within which may be disposed a lighting element 4 and a sensor and control module 6. The system 1 may also include a power pack 8 and a line powered entry station incorporating room controller functionality 10. The sensor and control module 6 may include an occupancy sensing element 12, a status indicator 13 such as a light emitting diode (LED), a light sensing element 14 such as a photocell, and a communications module 16, preferably a wireless communications module/chip. The communications module 16 may include a fixture processor 18 and a fixture transceiver 20. Though the fixture processor 18 and fixture transceiver 20 are shown and described as separate elements, they may be integrated, for example, onto a single mpu or chip. In alternate embodiments, a separate transceiver can be used in place of the fixture transceiver 20. The power pack 8 may be coupled to the sensor and control module 6 via one or more power and communications cables 22, 24 so that the power pack 8 can supply power to the sensor and control module 6 (via the power cable) and so that the sensor and control module 6 can command operation of the power pack 8 (via the communications cable). More preferably, the communication cable is a simple universal asynchronous receiver/transmitter (UART) connection for messaging between the sensor and control module 6 and the power pack 8. In the illustrated embodiment, the power pack 8 is disposed outside of the housing 3 of the lighting fixture 2. It will be appreciated, however, that embodiments are contemplated in which the power pack 8 is integrated into the housing 3. Alternatively, it will be appreciated that although the sensor and control module 6 is coupled to the lighting element 4 via power pack 8, in various embodiments communications between the sensor and control module 6 and the lighting element 4 may be direct, without the intervening power pack. For example, the sensor and control module may communicate directly with the lighting element driver or ballast. Alternatively, the sensor and control module may communicate directly with the lighting element. For example, the lighting element may be a COB and the sensor and control module may communicate directly with the COB via an applicable communication protocol (e.g., DMX). Communicating directly with the lighting element or its associated driver or ballast eliminates the need for the intervening relay or power pack.

The power pack 8 may be coupled to the lighting fixture 2. In addition, the power pack 8 is preferably coupled to a source of power (e.g., line power) 26 so that the lighting element 4 may be selectively illuminated. For example, the lighting element 4 may be selectively illuminated in response to an occupancy condition sensed by the occupancy sensing element 12 or a command from the room controller 10. The power pack 8 may provide relay switched power for turning the lighting fixture ON and OFF, along with 1-10Vdc dimmer control for dimming the lights UP and DOWN.

The fixture transceiver 20 may be coupled to an antenna 21 and may use any of a variety of suitable wireless transmission technologies including RF transmission using one of the many standards developed by the Institute of Electrical and Electronic Engineers (IEEE), infrared transmission using a standard from the Infrared Data Association (IrDA), or any other standardized and/or proprietary wireless communication technology. A non-limiting exemplary listing of appropriate wireless transmission technologies include ZigBee, Bluetooth, Wi-Fi, 802.15.4, near field communication (NFC), Z-wave.

The fixture processor 18 may be communicatively coupled to each of the individual components of the sensor and control module 6 to control one or more operational aspects of the lighting control system 1. For example, the fixture processor 18 is preferably communicatively coupled to the occupancy sensing element 12, the status indicator 13 and the light sensing element 14 so that the fixture processor 18 can receive occupancy detection and ambient light level information. The fixture processor 18 also preferably receives and processes incoming wireless messages via the fixture transceiver 20 and commands the transmission of outgoing wireless messages via the fixture transceiver 20. In one particularly preferred embodiment, the fixture processor 18 is configured to: (i) receive occupancy and ambient light level information from the occupancy sensing element 12 and light sensing element 14, respectively; (ii) manage the transmission of occupancy and ambient light level information to the room controller 10; (iii) receive messages from the room controller 10; and (iv) transmit operational command signals to the power pack 8 to control the lighting element 4. In other embodiments, the fixture processor may send a wireless message to a communicatively coupled entry station 10, room controller or other wireless lighting fixture, based on an occupancy condition sensed by the occupancy sensing element 12.

In one non-limiting exemplary embodiment, the communications module 16 includes a ZigBee radio capable of ZigBee router functionality. The communications module 16 may be configured to manage the occupancy and light sensing elements 12, 14 and for transmitting sensor status to the room controller 10 and for receiving commands from the room controller 10. A non-limiting example of an appropriate communications module 16 is a Silicon Labs ZigBee system on a chip (SOC) EM3581-RT. The EM3581-RT is a fully integrated SOC that integrates a 2.4 GHz, IEEE 802.15.4-2003-complaint transceiver, a microprocessor, flash and RAM memory.

The occupancy sensing element 12 may employ any of a variety of sensing technologies, including passive infrared (PIR), ultrasound (U/S), audio, video, microwave, and the like (or a combination thereof). In one non-limiting exemplary embodiment the occupancy sensing element 12 is a digital PIR sensor. The light sensing element 14 may, in one non-limiting exemplary embodiment, be a 0-10V digital photosensor. The lighting fixture 2 may be a troffer, a linear fixture, a pendant, a recessed fixture, a wall wash, or the like. The lighting element 4 may be any known lighting element now known or hereafter developed, including for example, incandescent bulbs or the like. Preferably, the lighting element 4 is a light emitting diodes (LEDs).

Figure 2A:
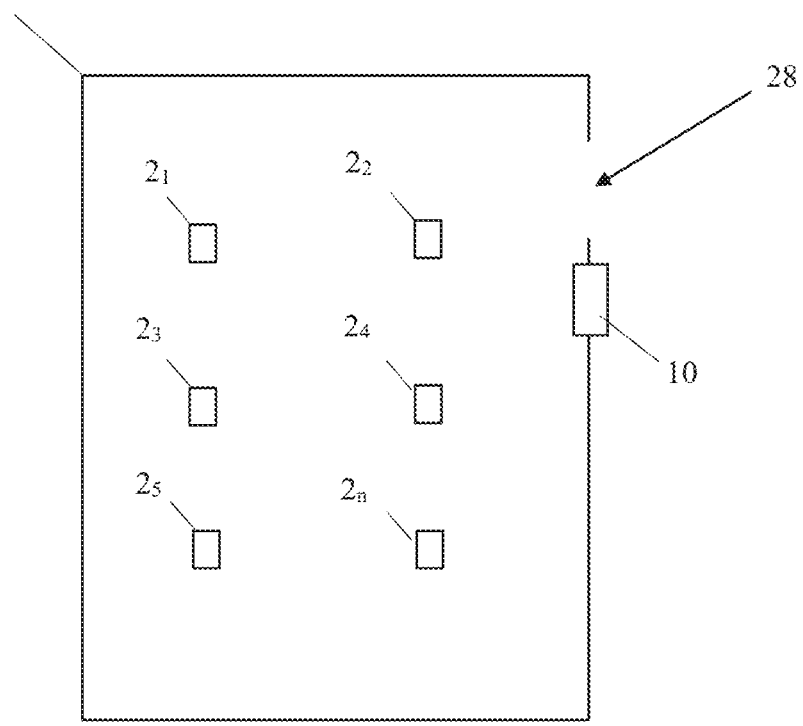

FIG. 2A shows an exemplary line powered entry station incorporating room control functionality 10 positioned in a room 30 having a plurality of lighting fixtures $2_{1-n}$ disposed therein. As will be described, the room controller 10 may be used to discover, group and control one or more of the plurality of lighting fixtures $2_{1-n}$. That is, for example, as described herein, the room controller is able to compile a list of nearby lighting fixtures via the network coordinator, is able to group all of the lighting fixtures in a room and is able to receive all of the occupancy and ambient light level information from the lighting fixtures in its network and based on the received information, make and transmit control information to each of the lighting fixtures. As shown, the room controller 10 may be mounted at or near an entrance 28 to the room 30. In other embodiments, as previously mentioned, the room controller may be located in a separate housing from the entry station. In these embodiments, the room controller 10 may be mounted in a ceiling structure associated with the room, while the battery powered entry station, if there is one, may be located anywhere in the room.

As shown in FIG. 2B, and as previously described, the line powered entry station 10 having room controller functionality preferably includes a first transceiver 32 having network coordinator functionality. In one non-limiting exemplary embodiment, the first transceiver 32 may be configured and programmed to function as a ZigBee coordinator. In one non-limiting exemplary embodiment, the first transceiver 32 comprises a ZigBee radio capable of ZigBee coordinator functionality. A non-limiting example of an appropriate first transceiver 32 is Silicon Labs' model EM358x-RT.

In the illustrated embodiment and as previously mentioned herein, the line powered entry station 10 also functions as a room controller, though it will be appreciated that other embodiments can include a separate room controller. It will be appreciated that although the processors are coupled to the AC source of line power 26, in practical application AC power would not be applied directly to the low voltage components of the entry station 10. Rather, and for example, at least an AC-DC converter would be coupled between the source of line power 26 and the first and second processors 34, 40. The first transceiver 32 may include a first processor 34, a first transceiver portion 36, and a first antenna 46. The first transceiver portion 36 is preferably communicatively coupled to the first processor 34. Though the first transceiver portion 36 and first processor 34 are shown and described as separate elements, they may be integrated, for example, on a single chip. Non-volatile memory may be associated with the first processor 34. Although not shown, the entry station 10 may have a plurality of buttons which can be programmed to control the lights $2_{1-n}$ in the room 30.

The first transceiver 32 may be programmed to manage the lighting fixtures $2_{1-n}$ in the room 30 based on occupancy and light sensing element 12, 14 status returned by each sensor and control module 6 and configurations derived via auto-commissioning and manual commissioning. In addition, the first transceiver 32 may be programmed to manage the lighting fixtures $2_{1-n}$ in the room 30 based on inputs received at the entry station 10, for example, by user initiated inputs.

The first transceiver 32 may function as a network coordinator comprising a node on a communications network that includes the entry station 10, and, once grouped, the plurality of lighting fixtures $2_{1-n}$ located in a room 30. The first transceiver 32 may establish the lighting network, and may store information about the lighting network, including security keys, for the end nodes including the plurality of lighting fixtures $2_{1-n}$. In one embodiment the formed communications network is a personal area network (PAN). In another embodiment the formed communications network is a ZigBee PAN.

As described in greater detail herein, the first transceiver 32 may supervise the formation of one or more lighting fixture groups that will be part of a communications network to be controlled by the line powered entry station 10 or a separate room controller (not shown). The first transceiver 32 may wirelessly communicate with a plurality of installed lighting fixtures $2_{1-n}$ to determine which lighting fixtures are located within the room 30 served by the entry station 10 (or separate room controller). Once the first transceiver 32 forms the lighting fixture group, the entry station 10 (or separate room controller) can then be used to turn the light elements 4 of each lighting fixture 2 in the group on and off in unison. Uniform dimming of the light elements 4 can also be achieved via the room controller.

The line powered entry station 10 may include a second wireless transceiver 38, which in one non-limiting exemplary embodiment is a Bluetooth transceiver, and more preferably BLE. The second transceiver may be used to communicate with a remote device such as a smartphone, smart tablet, laptop, or other computing device running a custom application ("App") which can facilitate commissioning, monitoring, remote control and application code updates. An example of an appropriate second transceiver 38 is a Texas Instruments BLE chip, such as model TI CC2541 or CC2640. The second transceiver 38 may include a second processor 40, and may have a second transceiver portion 42 with a second antenna 44 that is separate from the first antenna 46 of the first transceiver 32. In other embodiments the first transceiver 32 and the second transceiver 38 may share a single antenna. Though the second transceiver portion 42 and the second processor 40 are shown and described as separate elements, they may be integrated, for example, on a single chip. Non-volatile (or other suitable) memory may be associated with the second processor.

The first and second processors 34, 40 may be coupled in a manner that enables them to intercommunicate with each other. A wired communication coupling is shown, but this is not limiting. As will be appreciated, such intercommunication can allow information to be passed through the system 1 in an efficient manner. For example, a user may, with a remote device (e.g., smartphone, smart tablet, laptop, etc.) transmit configuration information/commands to the second transceiver 38 and second processor 40 via Bluetooth. The second processor 40 may pass this information to the first processor 34, and the first transceiver 32 may communicate this information to the communications module 16 associated with one or more lighting fixtures $2_{1-n}$. Information can be sent back to a user through the reverse path. For example, status information regarding the occupancy and light sensing elements 12, 14 and/or the lighting elements 4 of the lighting fixtures $2_{1-n}$ can be provided to the first transceiver 32 and first processor 34 via the communications module 16. The first processor 34 may then pass the information to the second processor 40 for Bluetooth transmission to the remote device via the second transceiver 38.

Although the illustrated embodiment shows a single network coordinator (i.e., first transceiver 32) associated with a single room 30, it will be appreciated that one network coordinator may alternatively cover more than one room. In such embodiments it is contemplated that each room 30 would have a dedicated room controller, however, it will be appreciated that in some embodiments a room controller may also serve multiple rooms. In further embodiments a gateway device may interconnect multiple group networks via Ethernet or other communication link. The gateway device may include ZigBee, Bluetooth or BLE protocols for communicating with such multiple group networks. In one non-limiting exemplary embodiment a BLE mesh may be used for this purpose. The Ethernet or other linking connections may also be used for cloud storage.

Figure 3:
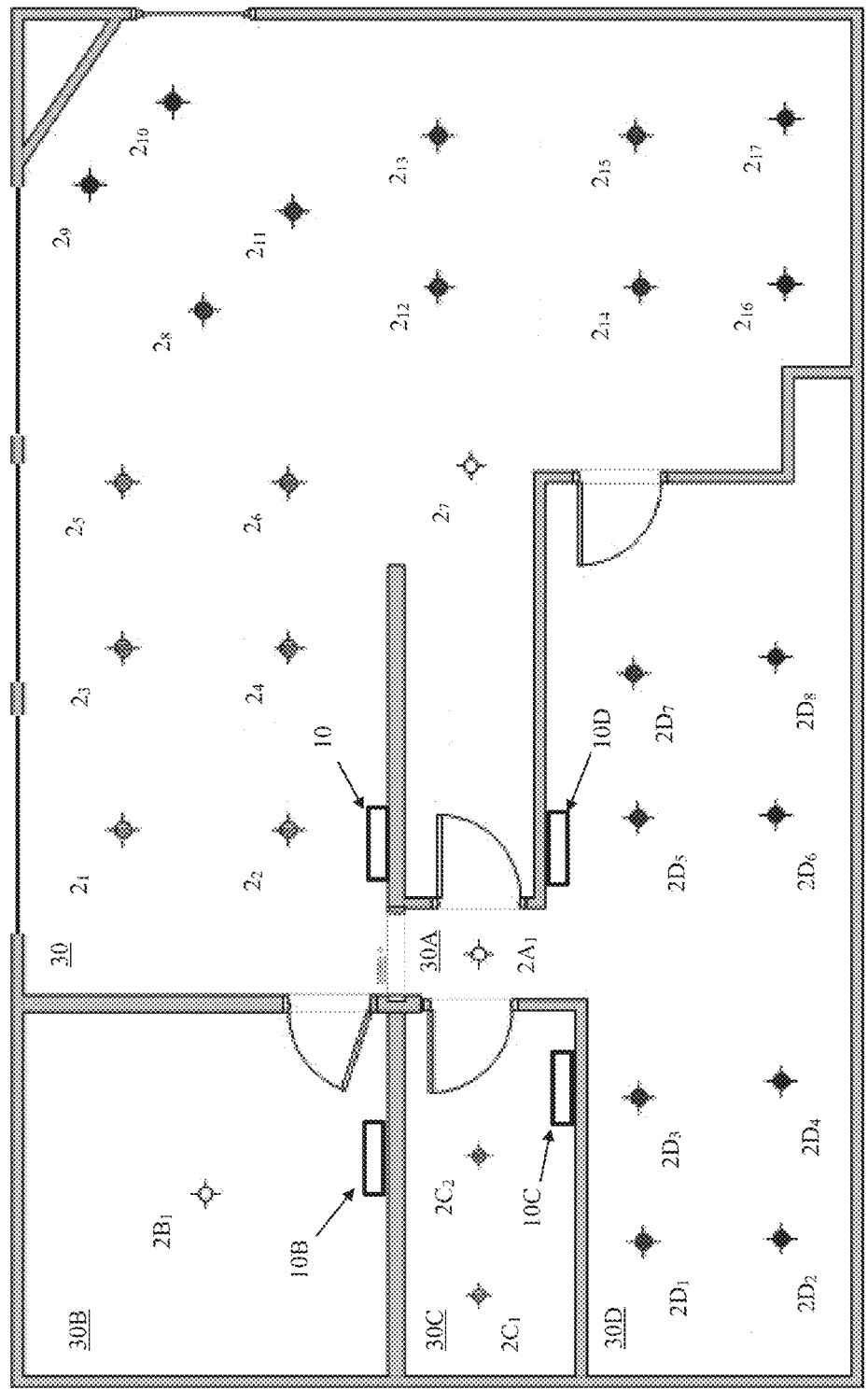
FIG. 3 is a plan view of an exemplary layout of lighting fixtures in multiple rooms of a building.

FIG. 3 shows an exemplary layout of lighting fixtures within a floor of a building. In this non-limiting exemplary embodiment, a plurality of rooms and/or hallways 30, 30A, 30B, 30C, 30D each include one or more installed lighting fixtures $2_{1-n}$, $2A_{1-n}$, $2B_{1-n}$, $2C_{1-n}$, $2D_{1-n}$. With the exception of room 30A, each of the rooms 30, 30B, 30C, 30D also has a designated entry station 10, 10B, 10C, 10D. The light 2A1 in room 30A may be discovered and controlled by an entry station of an adjacent room. As can be seen, certain of the lighting fixtures $2_1$, $2_3$, $2_5$, $2_9$, $2_{10}$ in one of the rooms 30 are located near a set of windows, while other of the lighting fixtures in the room are located further away from the windows. As will be described in greater detail later, the fixtures $2_1$, $2_3$, $2_5$, $2_9$, $2_{10}$ may be grouped in a separate zone, and may have one or more daylighting algorithms applied to the zone.

Figure 4:
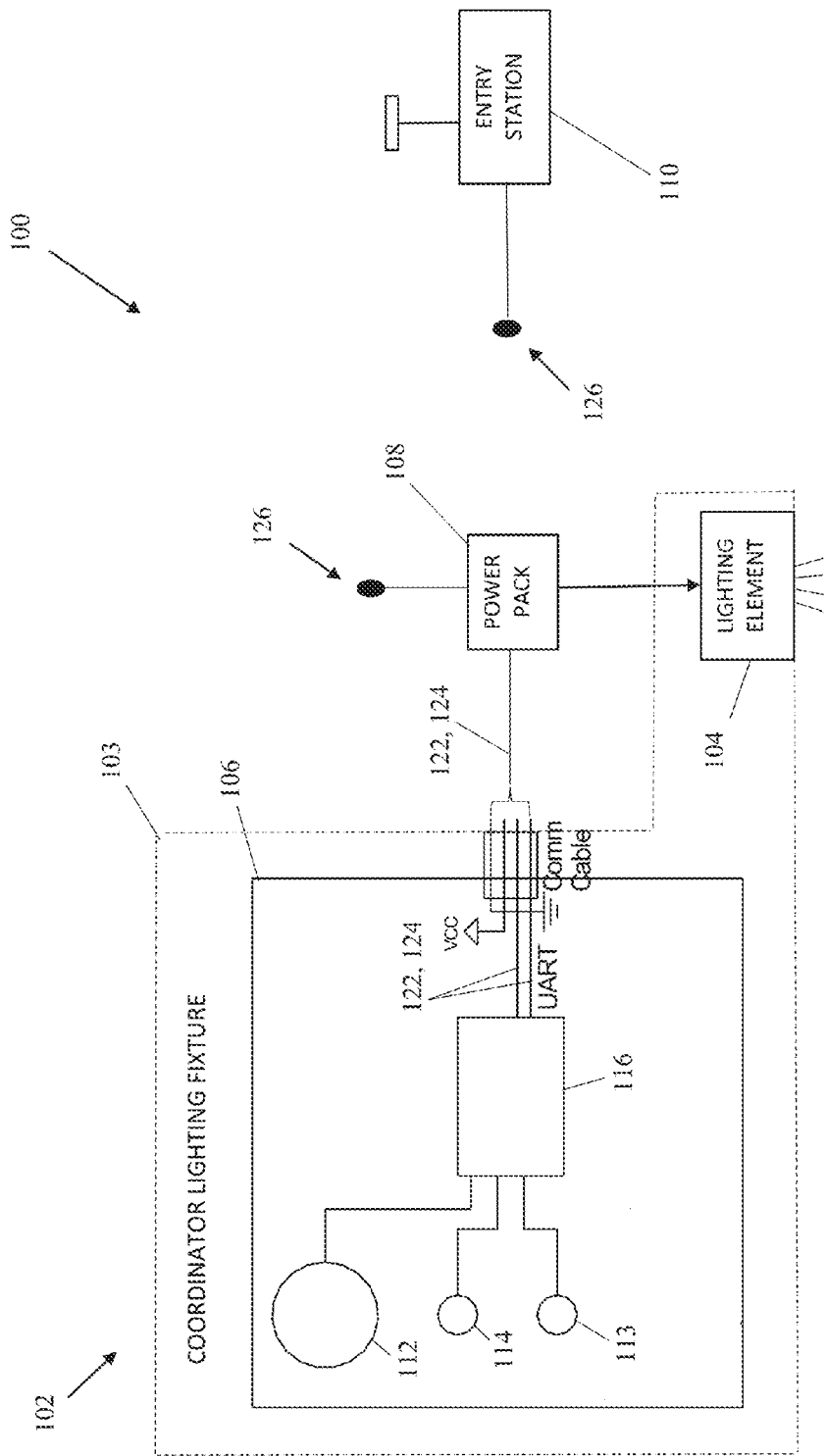
FIG. 4 is a schematic diagram of an exemplary lighting system according to a second preferred embodiment of the disclosure.
Figure 5:
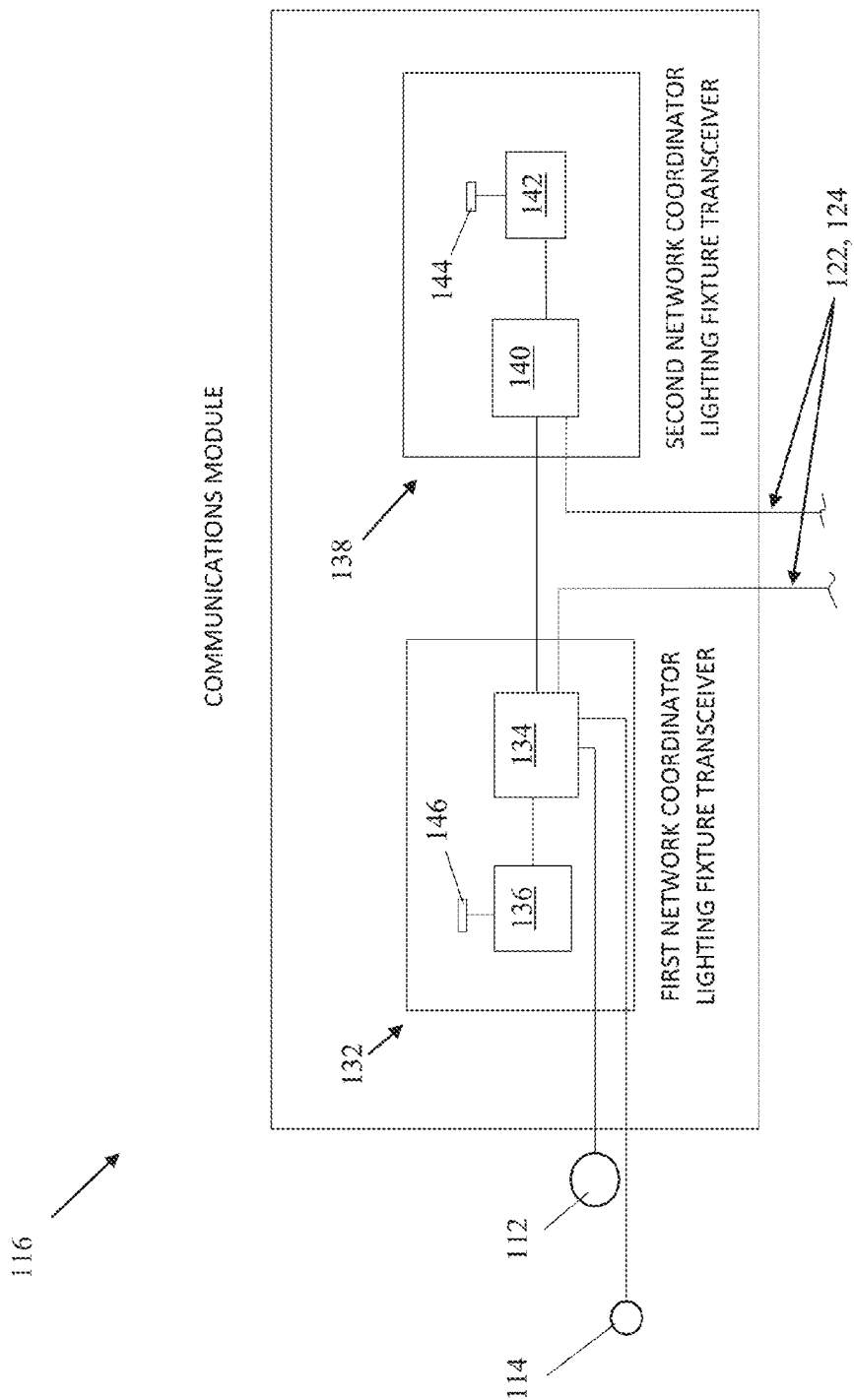
FIG. 5 is a schematic view of an embodiment of a sensor and control module for the lighting system of FIG. 4, the sensor and control module including multiple wireless transceivers.

Referring now to FIGS. 4 and 5, an alternate embodiment of a lighting control system 100 according to the present disclosure will now be described. The lighting control system 100 is substantially similar to the lighting control system 1 previously described except now, preferably, the network coordinator functionality and room controller functionality have been incorporated into a light fixture. As shown, the lighting control system 100 may include a lighting fixture 102 with a housing 103, and a sensor and control module 106. The sensor and control module 106 includes a communications module 116, which includes first and second network coordinator lighting fixture wireless transceivers 132, 138 disposed therein. An entry station 110 is also provided. The entry station may be wired or wireless. Preferably, the entry station includes a wireless chip for communicating with the network coordinator; more preferably, it includes a ZigBee chip for communicating with the network coordinator. With the system 100 of this embodiment, the network coordinator functionality of the entry station 10 (FIG. 1) may be incorporated into one of the lighting fixtures 102 in a particular room. For ease of explanation the lighting fixture having this network coordinator functionality will be referred to as a "network coordinator lighting fixture." The system 100 according to this embodiment may include the individual elements, features and functionalities of the lighting fixture 2 described in relation to FIG. 1, including a lighting element 104, an occupancy sensing element 112, a status indicator 113 such as a light emitting diode (LED), a light sensing element 114 and a communications module 116, and a power pack 108. In the present embodiment the entry station 110 may be provided with room controller functionality and not network coordinator functionality, since the network coordinator functionality is incorporated into the network coordinator lighting fixture 102. In other embodiments, room controller functionality may be provided in the network coordinator lighting fixture 102.

The sensor and control module 106 of this embodiment may include an occupancy sensing element 112 and a light sensing element 114. Power pack 108 may be coupled to the sensor and control module 106 via power and communications cables 122, 124 so that the power pack 108 can supply power to the sensor and control module 106 (via the power cable) and so that the sensor and control module 106 can command operation of the power pack 108 (via the communications cable). Preferably, the communications cable is a UART connection for messaging between the sensor and control module 106 and the power pack 108. Alternatively, as previously described, the sensor and control module 106 may communicate directly with the lighting element, or its associated driver without any intervening power pack 108.

The power pack 108 may be coupled to the lighting element 104. In addition, the power pack 108 is preferably coupled to a source of power (e.g., line power) 126 so that the lighting element 104 may be selectively illuminated. For example, the lighting element 104 may be selectively illuminated in response to an occupancy condition sensed by the occupancy sensing element 112, a command from the entry station 110, or a command from a room controller if the room controller is provided as an element separate from the entry station. The power pack 108 may provide relay switched power for turning the lighting fixture ON and OFF, along with 1-10Vdc dimmer control for dimming the lights UP and DOWN. Alternatively, as previously described, the sensor and control module may be communicatively coupled to the lighting element directly, without the intervening power pack.

Referring now to FIG. 5, the sensor and control module 106 of the network coordinator lighting fixture 102 will be described in greater detail. In this embodiment the communications module 116 of the sensor and control module 106 may include first and second network coordinator lighting fixture wireless transceivers 132, 138. In some embodiments the first network coordinator lighting fixture transceiver 132 may have network coordinator functionality. In one non-limiting exemplary embodiment, the first network coordinator lighting fixture transceiver 132 may be configured and programmed to function as a ZigBee network coordinator. In one non-limiting exemplary embodiment, the first network coordinator lighting fixture transceiver 132 includes a ZigBee radio capable of ZigBee network coordinator functionality. A non-limiting example of an appropriate third transceiver 132 is Silicon Labs' model EM358x-RT.

The first network coordinator lighting fixture transceiver 132 may include a first network coordinator lighting fixture transceiver portion 136, a first network coordinator lighting fixture processor 134 and a first network coordinator lighting fixture antenna 146. The transceiver portion 136 is preferably communicatively coupled to the processor 134. Although the transceiver portion 136 and the processor 134 are shown and described as separate elements, they may be integrated, for example, on a single chip. Non-volatile memory may be associated with the processor 134. The processor 134 may be programmed to manage the lighting fixtures $2_{1-n}$ in a room 30 (FIG. 2A) based on the status of the occupancy and light sensing elements 112, 114.

The first network coordinator lighting fixture transceiver 132 may function as a network coordinator comprising a node on a communications network, and, once grouped, that includes the plurality of lighting fixtures $2_{1-n}$ located in a room 30. The transceiver 132 may establish the network, and may store information about the network, including security keys, for the end nodes including the plurality of lighting fixtures $2_{1-n}$. In one embodiment the formed communications network is a personal area network (PAN). In another embodiment the formed communications network is a ZigBee PAN.

As will be described in greater detail herein, the first network coordinator lighting fixture transceiver 132 may supervise the formation of one or more lighting fixture groups that will be part of a communications network to be controlled by the entry station 110 or a separate room controller (not shown). The transceiver 132 may wirelessly communicate with a plurality of installed lighting fixtures $2_{1-n}$ to determine which lighting fixtures are located within the room served by the entry station 110 (or separate room controller). Once the transceiver 132 forms the lighting fixture group, the entry station 110 (or separate room controller) can then be used to turn the light elements 104 of each lighting fixture 102 in the group on and off in unison. Uniform dimming of the lighting elements 104 can also be achieved via the room controller.

As mentioned, the sensor and control module 106 may include a second network coordinator lighting fixture transceiver 138, which in one non-limiting exemplary embodiment is a Bluetooth transceiver. The second network coordinator lighting fixture transceiver 138 may be used to communicate with a remote device such as a smartphone, smart tablet, laptop, or other computing device running a custom application ("App") which can facilitate commissioning, monitoring, remote control and application code updates. An example of an appropriate fourth transceiver 138 is a Texas Instruments TI CC2541 or CC2640. The second network coordinator lighting fixture transceiver 138 may include a second network coordinator lighting fixture processor 140 and may include a second network coordinator lighting fixture transceiver portion 142 with a second network coordinator lighting fixture antenna 144 that is separate from the antenna 146 of the first network coordinator lighting fixture transceiver 132. In other embodiments the first network coordinator lighting fixture transceiver 132 and the second network coordinator lighting fixture transceiver 138 may share a single antenna. Though the second network coordinator lighting fixture processor 140 and the second network coordinator lighting fixture transceiver portion 142 are shown and described as separate elements, they may be integrated, for example, on a single chip. Non-volatile memory may be associated with the second network coordinator lighting fixture processor 140.

The first and second network coordinator lighting fixture processors 134, 140 may be coupled in a manner that enables them to intercommunicate with each other. A wired communication coupling is shown, but is not limiting. As will be appreciated, such intercommunication can allow information to be passed through the system 100 in an efficient manner. For example, a user may, with a remote device (e.g., smartphone, smart tablet, laptop, etc.) provide configuration information/commands to the second network coordinator lighting fixture transceiver 138 and second network coordinator lighting fixture processor 140 via Bluetooth. The second network coordinator lighting fixture processor 140 may pass this information to the first network coordinator lighting fixture processor 134, and the first network coordinator lighting fixture transceiver 132 may communicate this information to the communications module 116 associated with one or more sensor modules 106 associated with others of the lighting fixtures 2$_{1-n}$ in a particular room. Information can be sent back to a user through the reverse path in the manner previously described.

It will be appreciated that preferably only one of the lighting fixtures 102 in a particular room may have network coordinator functionality. The remaining lighting fixtures 2 installed in the room may be associated with "single-transceiver" sensor modules 6 as described in relation to FIG. 1.

In some embodiments, after the discovery and grouping process is completed, the lighting fixture having network coordinator functionality may cede control functionality to the room controller. Alternatively, control functionality may be maintained by the lighting fixture having network coordinator functionality.

The first and second network coordinator lighting fixture wireless transceivers 132, 138 may use any of a variety of suitable wireless transmission technologies including RF transmission using one of the many standards developed by the Institute of Electrical and Electronic Engineers (IEEE), infrared transmission using a standard from the Infrared Data Association (IrDA), or any other standardized and/or proprietary wireless communication technology. A non-limiting exemplary listing of appropriate wireless transmission technologies include ZigBee, Bluetooth, Z-wave, NFC and Wi-Fi, 802.15.4.

Figure 6:
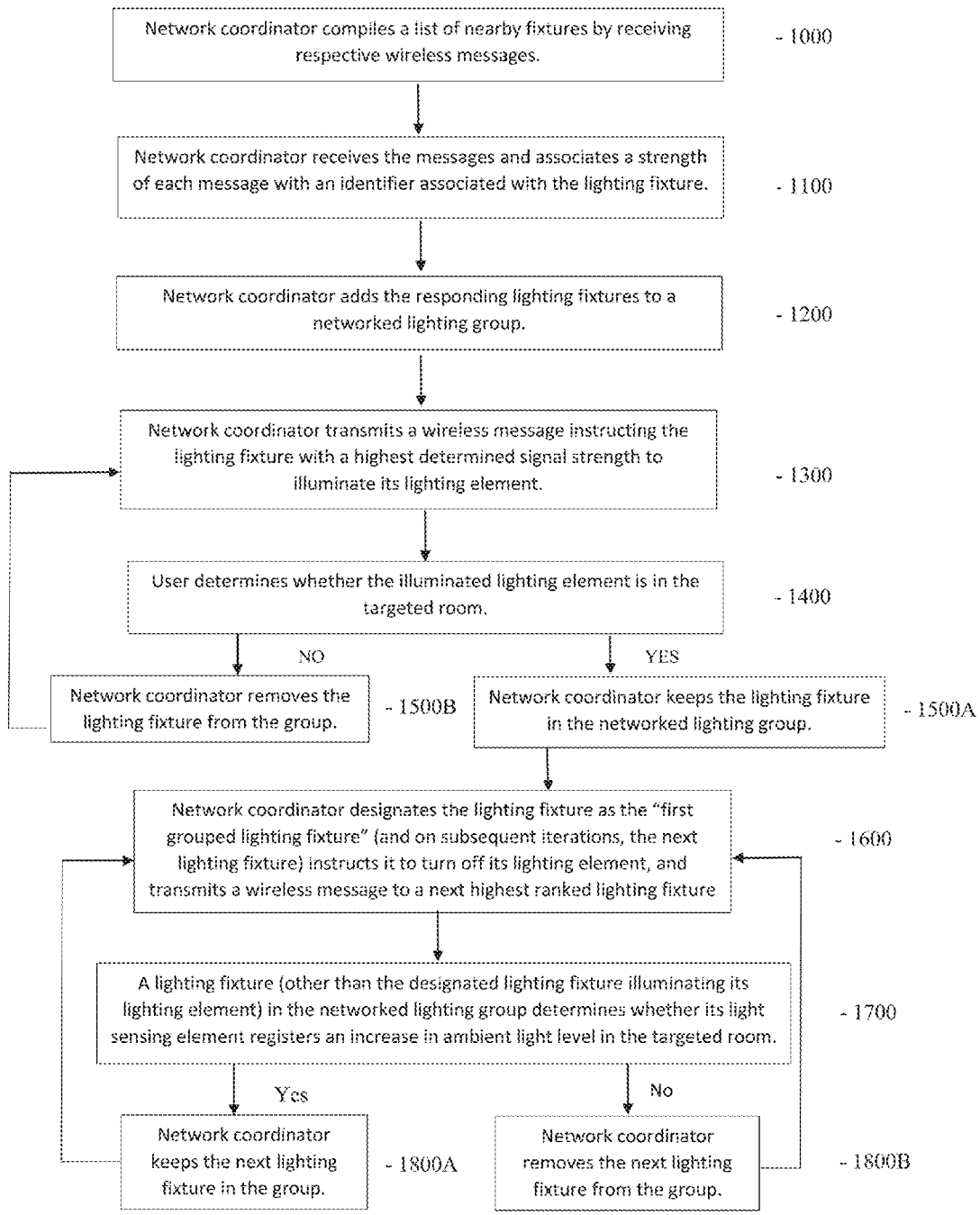
FIG. 6 is a logic diagram illustrating a first preferred embodiment of the disclosed method.

FIG. 6 is a logic diagram illustrating a first preferred embodiment of a disclosed method wherein the network coordinator is in the entry station. At 1000, the network coordinator compiles a list of nearby nodes via, for example, a plurality of lighting fixtures 2$_{1-n}$ sending respective individual wireless messages or beacons to the network coordinator (e.g., first transceiver 32 of entry station 10). At least a subset of the plurality of lighting fixtures 2$_{1-n}$ are installed in a targeted room 30 (the targeted room being the room or area in which it is intended that a plurality of the lighting fixtures be formed into a networked lighting group for unitary configuration and control). In some embodiments the wireless messages may include a serial number or other identifier associated with each of the lighting fixtures 2$_{1-n}$ sending the message.

In some embodiments, as previously described, the plurality of lighting fixtures 2$_{1-n}$ may send the respective individual wireless messages upon being powered up or turned on, and may continue to send the wireless messages until they have been added to the lighting network. In other embodiments, as will be described in greater detail below, the plurality of lighting fixtures 2$_{1-n}$ may send the respective individual wireless messages upon triggering of the lighting fixture's occupancy sensing element 14 (i.e., when the occupancy sensing element senses movement, which in one embodiment is the presence of a person in the targeted room 30). For example, an installer may walk through the targeted room 30 to cause the plurality of lighting fixtures 2$_{1-n}$ to send the respective individual wireless messages. Using the occupancy sensing element to trigger the sending of respective individual wireless messages may have an advantage in that it can reduce the total number of lighting fixtures allowed to initially join the network as compared to arrangements in which all lighting fixtures automatically send their individual wireless messages upon powering up or in response to a wireless message received from the network coordinator. In the latter cases it may be expected that lighting fixtures in adjacent rooms and/or spaces would be allowed initially to join the network, and would thus require subsequent removal from the network using one or more of the methods disclosed herein. By using the occupancy sensing element to trigger the sending of wireless messages from a lighting fixture, lighting fixtures in adjacent rooms and/or spaces would not initially join the network, which would reduce the total number of lighting fixtures that would have to be removed later.

In still further embodiments, the network coordinator may transmit a wireless activation message to a plurality of lighting fixtures 2$_{1-n}$ after being prompted by the installer. The wireless activation message may include a command to each of plurality of lighting fixtures 2$_{1-n}$ instructing them to send the respective individual wireless messages. The network coordinator may be prompted to send the wireless activation message via a button or key press at the entry station 10. For example, the installer may press and hold one or more buttons simultaneously on the entry station, which, among other actions may cause the entry station to transmit a wireless message to a plurality of lighting fixtures 2$_{1-n}$. In other embodiments the network coordinator may be prompted to send the wireless activation message by a remote device communicating with a second transceiver 38 associated with of the entry station. For example, the installer may prompt the entry station to transmit a wireless message to a plurality of lighting fixtures 2$_{1-n}$ via the APP on his/her smart device.

In some embodiments the status indicator 13 of each of the plurality of lighting fixtures 2$_{1-n}$ may light up or change brightness when the wireless messages are sent from each of the plurality of lighting fixtures. In other embodiments the status indicator may blink, dim or shine with greater intensity. This may enable an installer to confirm that all of the lighting fixtures 2$_{1-n}$ in the targeted room 30 are sending wireless signals to the network coordinator.

At 1100 the network coordinator receives the wireless messages from the plurality of lighting fixtures 2$_{1-n}$ and may create an inventory of lighting fixtures 2$_{1-n}$. The network coordinator may associate a strength of signal from each of the wireless messages with a serial number or other identifier associated with the lighting fixture transmitting the wireless message. At 1200 the network coordinator includes all of the responding lighting fixtures in the networked lighting group and stores a list of the responding lighting fixtures 2$_{1-n}$ in memory. The responding light fixtures 2$_{1-n}$ may be ranked by determined signal strength. In some embodiments this list (including ranking) is stored in memory associated with the network coordinator. At 1300 the network coordinator can transmit a wireless message instructing the lighting fixture 2$_x$ with the highest determined signal strength (i.e., the "first lighting fixture") to illuminate its lighting element 4.

At 1400, the installer may determine whether the illuminated lighting element 4 is in the targeted room 30 (e.g., by visual observation). If the illuminated lighting element 4 is determined to be in the room, then the installer may confirm to the network coordinator that the first lighting fixture 2$_x$ is present in the targeted room. This confirmation can be provided by pressing a button, soft key or other data entry feature on the entry station 10. Alternatively, where a remote device is being used to commission the system, confirmation can be provided by tapping a button on the app associated with the remote device. If, at 1400 the installer determines that the first light 2$_x$ is located within the targeted room, then at 1500A the network coordinator may keep the first light 2$_x$ in the networked lighting group. If, however, at 1400 the installer observes that the illuminated lighting element 4 is not in the targeted room 30, then at 1500B the installer may communicate this information to the network coordinator through inaction (e.g., no button press for a predetermined period of time such as, but not limited to, 5 seconds). Alternatively, a separate button press, soft key press or data entry feature on the entry station 10 or remote device may be employed to affirmatively indicate that the first lighting fixture $2_x$ is not in the targeted room 30. Upon receiving an indication that the first lighting fixture $2_x$ is not in the targeted room 30, at 1500B, the network coordinator may remove the first lighting fixture from the networked lighting group. The network coordinator can then instruct the first lighting fixture to turn its lighting element 4 off. The method may then return to step 1300 and the network coordinator may transmit a wireless message instructing the lighting fixture with the next highest determined signal strength to illuminate its lighting element. Steps 1400, 1500A, and 1500B may then be repeated until one of the lighting fixtures $2_{1-n}$ in the ranked list is determined to be in the targeted room 30. The network coordinator may then keep the lighting fixture illuminating its lighting element in the networked lighting group, identifying it as the "first grouped lighting fixture."

If the first lighting fixture $2_x$ is determined to be in the targeted room 30, then at 1600 the network coordinator designates the first lighting fixture $2_x$ as the "first grouped lighting fixture" and transmits a wireless message instructing the first grouped lighting fixture to turn off its lighting element 4.

When a first one of the lighting fixtures $2_x$ is determined to be in the targeted room 30, at 1600 the installer may activate an automated grouping process by inputting another button push, soft key press or data entry feature on the entry station 10, or via the remote device. The automated grouping process may start with the network coordinator transmitting a wireless message to the first grouped lighting fixture $2_x$ to turn off its light element 4, and may transmit a wireless message to a "next lighting fixture" $2_{x+1}$ in the ranked list (i.e., the lighting fixture ranked next behind the "first grouped lighting fixture"), instructing it to illuminate its lighting element 4. At 1700 the first grouped lighting fixture $2_x$ may determine whether its light sensing element 14 registers an increase in ambient light level in the targeted room 30 when the next lighting fixture illuminates its lighting element 4. If an increase in ambient light level is sensed, then at 1800A the first grouped lighting fixture $2_x$ may transmit a wireless message to the network coordinator to confirm that the next lighting fixture $2_{x+1}$ is in the targeted room 30. The network coordinator may keep the next lighting fixture $2_{x+1}$ in the networked lighting group and may send a wireless message to the lighting fixture illuminating its lighting element instructing it to turn off its light element 4.

If, however, the light sensing element 14 of the first grouped lighting fixture $2_x$ does not see an increase in light from its light sensing element when the next lighting fixture illuminates its light element 4, then the first grouped lighting fixture may simply do nothing, and within a predetermined period of time (a non-limiting example of which is 1-10 seconds) if the network coordinator does not receive a wireless message from the first grouped lighting fixture the network coordinator may assume that the next lighting fixture $2_{x+1}$ is not the targeted room 30. At 1800B the network coordinator may then remove the next lighting fixture $2_{x+1}$ from the networked group. In some embodiments, if the light sensing element 14 of the first grouped lighting fixture does not sense an increase in light when the next lighting fixture illuminates its light element 4, then the first grouped lighting fixture $2_x$ may transmit a wireless message to the network coordinator to confirm that the next lighting fixture $2_{x+1}$ is not in the targeted room 30. The network coordinator may then remove the next lighting fixture from the networked group.

Steps 1600-1800A, B can be repeated until all of the lighting fixtures $2_{1-n}$ in the targeted room 30 are identified and included in the networked lighting group, and the lighting fixtures that are not in the targeted room are removed from the networked lighting group. A full list of lighting fixtures $2_{1-n}$ in the targeted room 30 can then be maintained by the network coordinator. To confirm this, the network coordinator may transmit a wireless message to all of the lighting fixtures in the group to illuminate their light elements in unison. Other features such as a fade up or down in light intensity can also be instructed, with all lighting fixtures in the group responding together to fade up and/or down in unison.

In the embodiment described in relation to FIG. 6 the network coordinator alone makes the determination about whether a particular lighting fixture $2_x$ is located within the targeted room based on whether a light sensing element 14 of the first lighting fixture $2_1$ (which is known to be in the room) senses changes in ambient light levels when individual lighting fixtures are sequentially illuminated. In other embodiments, however, the light sensing elements 14 of multiple lighting fixtures $2_{1-n}$ can be employed to determine if a particular lighting fixture $2_x$ is located within the targeted room.

For example, once the network coordinator determines that a first lighting fixture $2_1$ and a second lighting fixture $2_2$ are located within the targeted room, it may instruct those lighting fixtures to turn off their lighting elements 4. The network coordinator may then instruct the lighting fixture 23 having the next highest acknowledgement signal ranking "the next lighting fixture" to illuminate its light element. If the light sensing elements 14 of either lighting fixture $2_1$ or $2_2$ senses an increase in ambient light level when the next lighting fixture $2_3$ illuminates its light element, then the network coordinator can assume that the next lighting fixture $2_3$ is located within the targeted room and can keep the next lighting fixture in the group. The network coordinator may then instruct the next lighting fixture $2_3$ to turn off its lighting element 4.

This process can be repeated until all of the lighting fixtures $2_{2-n}$ in the ranked list have been turned on and a determination made (based on the existence of sensed changes in ambient light levels by the light sensing elements of all of the previously-grouped lighting fixtures) about whether the lighting fixtures are in the targeted room.

It will be appreciated that the process can also be done manually, with the network coordinator sequentially instructing each of the lighting fixtures $2_{1-n}$ in the ranked list to turn their lighting elements 4 on and the installer manually confirming, through button press, soft key press or other data entry feature at the entry station 10 or via the remote device, whether the individual lighting fixtures $2_{1-n}$ are in the targeted room 30. The network coordinator can, based on the installer's inputs, compile a list of which lighting fixtures $2_{1-n}$ to include in a particular group and which lighting fixtures will not be part of that group.

Figure 7:
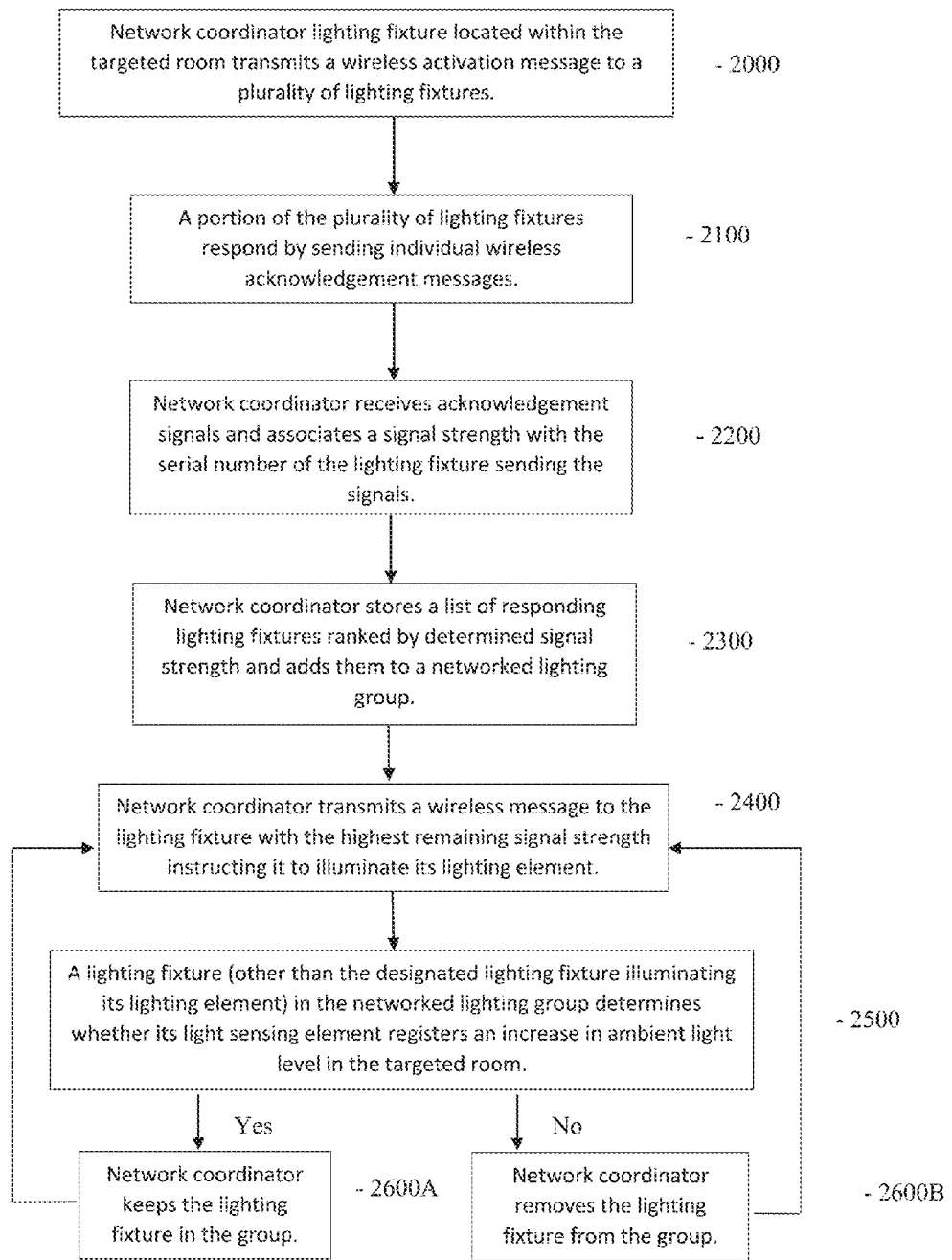
FIG. 7 is a logic diagram illustrating a second preferred embodiment of the disclosed method.

FIG. 7 is a logic diagram illustrating a second preferred embodiment of the disclosed method wherein the network controller functionality is located in one of the sensor and control modules of a fixture. As will be understood, the method according to this embodiment may employ at least one lighting fixture 102 that acts as a network coordinator in the manner described in relation to previous embodiment of the disclosed method. Thus, certain functionality of the room controller described in relation to FIGS. 1-2B are incorporated into one of the lighting fixtures $102_{1-n}$. In some embodiments this lighting fixture may be referred to as the "network coordinator lighting fixture" $102_1$. In some embodiments the network coordinator lighting fixture will be positioned within the room to be commissioned (i.e., a "targeted room.") In one non-limiting exemplary embodiment the network coordinator lighting fixture may include first and second network coordinator lighting fixture transceivers 132, 138. The network coordinator lighting fixture may include ZigBee coordinator functionality, with a ZigBee transceiver constituting the first network coordinator lighting fixture transceiver 132. The network coordinator lighting fixture may also include a Bluetooth transceiver as the second network coordinator lighting fixture transceiver 138 to enable communication with a remote device such as a smart phone, smart tablet or the like.

The auto-commissioning process in connection with the second preferred embodiment is substantially similar to the auto-commissioning process described above in connection with the first preferred embodiment, however since the network coordinator is now located within the lighting fixture, the process of determining the first lighting fixture in the targeted room may not be necessary since it is known that the network coordinator lighting fixture is in the targeted room. As with the method described in relation to FIG. 6, the network coordinator compiles a list of nearby nodes via, for example, a plurality of lighting fixtures $102_{1-n}$ sending respective individual wireless messages or beacons to the network coordinator (e.g., first transceiver 132 of the communications module 116) so that the network coordinator can discover the lighting fixtures and rank the signal strength of their messages. At least a subset of the plurality of lighting fixtures $2_{1-n}$ are installed in a targeted room 30 (the targeted room being the room or area in which it is intended that a plurality of the lighting fixtures be formed into a networked lighting group for unitary configuration and control). In some embodiments the wireless messages may include a serial number or other identifier associated with each of the lighting fixtures $2_{1-n}$ sending the message.

Thus, in some embodiments, the plurality of lighting fixtures $102_{1-n}$ may send their respective individual wireless messages upon being powered up or turned on, and may continue to send the wireless messages until they have been added to the lighting network. In other embodiments, as will be described in greater detail below, the plurality of lighting fixtures $102_{1-n}$ may send their respective individual wireless messages upon triggering of the lighting fixture's occupancy sensing element 112 (i.e., when the occupancy sensing element senses movement, which is the presence of a person in the targeted room 30). For example, an installer may walk through the targeted room 30 to cause the plurality of lighting fixtures $102_{1-n}$ to send its respective individual wireless message. Using the occupancy sensing element to trigger the sending of respective individual wireless messages may have an advantage in that it can reduce the total number of lighting fixtures allowed to initially join the network as compared to arrangements in which all lighting fixtures automatically send their individual wireless messages upon powering up or in response to a wireless message received from the network coordinator. In the latter cases it may be expected that lighting fixtures in adjacent rooms and/or spaces would be allowed initially to join the network, and would thus require subsequent removal from the network using one or more of the methods disclosed herein. By using the occupancy sensing element to trigger the sending of wireless messages from a lighting fixture, lighting fixtures in adjacent rooms and/or spaces would not initially join the network, which would reduce the total number of lighting fixtures that would have to be removed later.

In some embodiments the status indicator 113 of each of the plurality of lighting fixtures $102_{1-n}$ may light up or change brightness when the wireless messages are sent from each of the plurality of lighting fixtures. In other embodiments the status indicator may blink, dim or shine with greater intensity. This may enable the installer to confirm that all of the lighting fixtures $102_{1-n}$ in the targeted room 30 are sending wireless signals to the network coordinator.

As a further alternative, the network coordinator may transmit a wireless activation message to a plurality of lighting fixtures $2_{1-n}$ after being prompted by the installer. The wireless activation message may include a command to each of plurality of lighting fixtures $2_{1-n}$ instructing them to send the respective individual wireless messages. The network coordinator may be prompted to send the wireless activation message via a remote device that may send a wireless message to the second network coordinator lighting fixture transceiver 138 of the network coordinator lighting fixture $102_1$, instructing the network coordinator lighting fixture to begin a discovery and grouping process. In one non-limiting exemplary embodiment, the remote device is a smartphone, tablet or laptop, the second network coordinator lighting fixture transceiver 138 is a Bluetooth transceiver and the wireless message is a Bluetooth message. Thus, the second network coordinator lighting fixture transceiver 138 may instruct the first network coordinator lighting fixture transceiver 132 to have the network coordinator (first network coordinator lighting fixture transceiver 132) begin the discovery and grouping process. For example, the installer may prompt the network coordinator to transmit a wireless message to a plurality of lighting fixtures $2_{1-n}$ via the APP on his/her smart device. In another embodiment, the network coordinator may be prompted to send the wireless activation message via a button or key press at the entry station 10.

Referring to FIG. 7, at step 2000, the network coordinator compiles a list of nearby nodes via any method herein described or known. For example, as previously described, the plurality of lighting fixtures $102_{1-n}$ can send respective individual wireless messages upon being powered up or turned on. In other embodiments, the plurality of lighting fixtures $102_{1-n}$ may send the respective individual wireless messages upon triggering of the lighting fixture's occupancy sensing element 112. In still further embodiments, the network coordinator may transmit a wireless activation message to a plurality of lighting fixtures $102_{1-n}$ after being prompted by the installer. Alternatively, the network coordinator can transmit a wireless activation message to the plurality of lighting fixtures $102_{2-n}$. As will be appreciated, at least some of the plurality of lighting fixtures $102_{2-n}$ will be located within the targeted room, while some of the plurality of lighting fixtures may be located outside of the targeted room. At least some of the plurality of lighting fixtures $102_{2-n}$ will receive the wireless message and at 2100 can respond by sending individual wireless acknowledgement messages. In some embodiments the acknowledgement signal may include a serial number or other identifier associated with the lighting fixture $102_{2-n}$ sending the acknowledgement message. At 2200 the network coordinator in the network coordinator lighting fixture $102_1$ may receive the acknowledgement signals and may associate a signal strength of the acknowledgment message with the serial number or other identifier associated with the lighting fixture sending the signal. At 2300 the network coordinator may store a list of responding lighting fixtures $102_{2-n}$ ranked by determined signal strength, and may add the responding lighting fixtures to a networked lighting group. In some embodiments this list is stored in memory associated with the network coordinator. At 2400 the network coordinator can transmit a wireless message instructing the lighting fixture $102_x$ with the highest determined signal strength (i.e., the "lighting fixture with the highest remaining signal strength") to illuminate its light element 104.

At 2500 the network coordinator lighting fixture determines if the lighting fixture with the highest remaining signal strength $102_x$ is located within the targeted room 30. Thus, if the light sensing element 114 of the network coordinator lighting fixture $102_1$ senses an increase in light from its light sensing element when the lighting fixture with the highest remaining signal strength $102_x$ illuminates its light element, the network coordinator may at 2600A keep the lighting fixture with the highest remaining signal strength in the group. If, however, the light sensing element 114 of the network coordinator lighting fixture $102_x$ does not see an increase in light from its light sensing element when the lighting fixture with the highest remaining signal strength illuminates its light element 104, the network coordinator may at 2600B remove the lighting fixture with the highest remaining signal strength from the group. Alternatively, the network coordinator may "flag" the lighting fixture with the highest remaining signal strength and retry to detect the flagged lighting fixture prior to removing the flagged lighting fixture from the group, as previously described above.

This process can be repeated until all of the lighting fixtures in the targeted room are identified and included in the group. A full list of lighting fixtures in the targeted room is generated by the network coordinator. To confirm this, the network coordinator may transmit a wireless message to all of the lighting fixtures $102_{1-n}$ in the group to illuminate their light elements 104 in unison. Other features such as a fade up or down in light intensity (or blinking) can also be instructed, with all lighting fixtures in the group responding together to fade up and/or down in unison.

In the embodiment described in relation to FIG. 7 the network coordinator lighting fixture $102_1$ (i.e., the network coordinator) alone makes the determination about whether a particular lighting fixture $102_x$ is located within the targeted room based whether its light sensing element 114 senses changes in ambient light levels when individual lighting fixtures are sequentially illuminated. In other embodiments, however, the light sensing elements 114 of multiple lighting fixtures $102_{1-n}$ can be employed to determine if a particular lighting fixture $102_x$ is located within the targeted room.

For example, once the network coordinator lighting fixture $102_1$ determines that the lighting fixture with the highest remaining signal strength $102_2$ is located within the targeted room, it may instruct the lighting fixture with the highest remaining signal strength to turn off its lighting element 104. The network coordinator lighting fixture $102_1$ may then instruct the lighting fixture having the next highest acknowledgement signal ranking "the next lighting fixture" to illuminate its light element. If the light sensing element 114 of either the network coordinator lighting fixture $102_1$ or the light sensing element of the lighting fixture with the highest remaining signal strength $102_2$ sense an increase in ambient light level when the next lighting fixture $102_x$ illuminates its light element 104, the network coordinator can assume that the next lighting fixture $102_x$ is located within the targeted room and can keep the next lighting fixture in the group. This process can be repeated until all of the lighting fixtures $102_{2-n}$ in the ranked list have been turned on and a determination made (based on the existence of sensed changes in ambient light levels by the light sensing elements of all of the previously-grouped lighting fixtures) about whether the lighting fixtures are in the targeted room.

Figure 8:
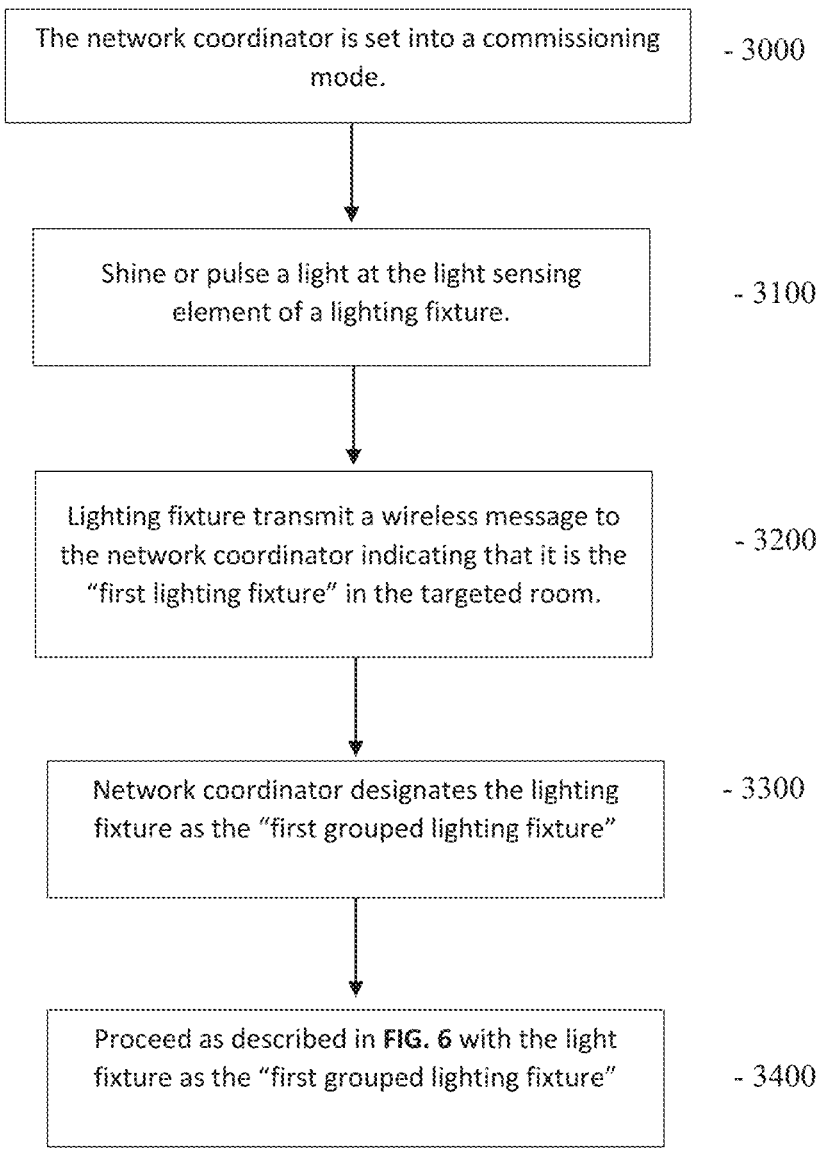
FIG. 8 is a logic diagram illustrating a third preferred embodiment of the disclosed method.

FIG. 8 is a logic diagram illustrating a third preferred embodiment of the disclosed method wherein manual initiation using a remote device is used. The methods described in relation to FIG. 6 describes a procedure for determining the first lighting fixture. It will be appreciated that a manual procedure may also be used to initiate determination of the first lighting fixture. For example, in one embodiment the determination of the first lighting fixture may be initiated by, at step 3000, placing the network coordinator located in the entry station or network coordinator lighting fixture into a commissioning mode. This may be accomplished by any of the numerous mechanisms herein described or known. At step 3100, the installer may shine or pulse a light at the light sensing element 114 of a lighting fixture $102_1$. Next, at 3200, the lighting fixture $102_1$ may transmit a wireless message to the network coordinator informing the network coordinator that it is in the targeted room and that it should be deemed the first lighting fixture $102_1$. At 3300, the network coordinator designates the lighting fixture $102_1$ as the first lighting fixture. At 3400, the auto-commission process described above in connection with FIG. 6 is performed as described.

In some embodiments the process for determining the first lighting fixture may be initiated (step 3000) by providing a coded set of light pulses provided to the light sensing element of the lighting fixture $102_1$. The coded set of light pulses may take on any form. For example, in a preferred embodiment, the coded set of light pulses may involve quickly turning on and off the flashlight in a predetermined period of time. In one non-limiting exemplary embodiment, a predetermined set of three light flashes within five seconds may constitute the coded set of light pulses. A light source such as a flashlight, a laser source, or other source of visible light could be used for this purpose. Alternatively, a light source having a predetermined wavelength or range of wavelengths that are different from visible light (e.g., ultraviolet, infrared) may be used to initiate the commissioning process provided only that the light sensing elements of the lighting fixtures are able to recognize such non-visible light. Using a coded set of visible or non-visible light pulses to initiate the commissioning process may avoid inadvertent initiating of the process for example by maintenance or other personnel shining a flashlight or other light source into the light sensing element 114 of the lighting fixture $102_1$ during routine inspection of the ceiling or room. Moreover, to avoid inadvertent initiating of the process, the system may also require one or more additional steps to be taken. For example, in addition to shining a light or a coded set of light pulses, the lighting fixture may also be programmed to require simultaneous detection of motion using the occupancy sensing element to avoid inadvertent initiating of the process.

Figure 12:
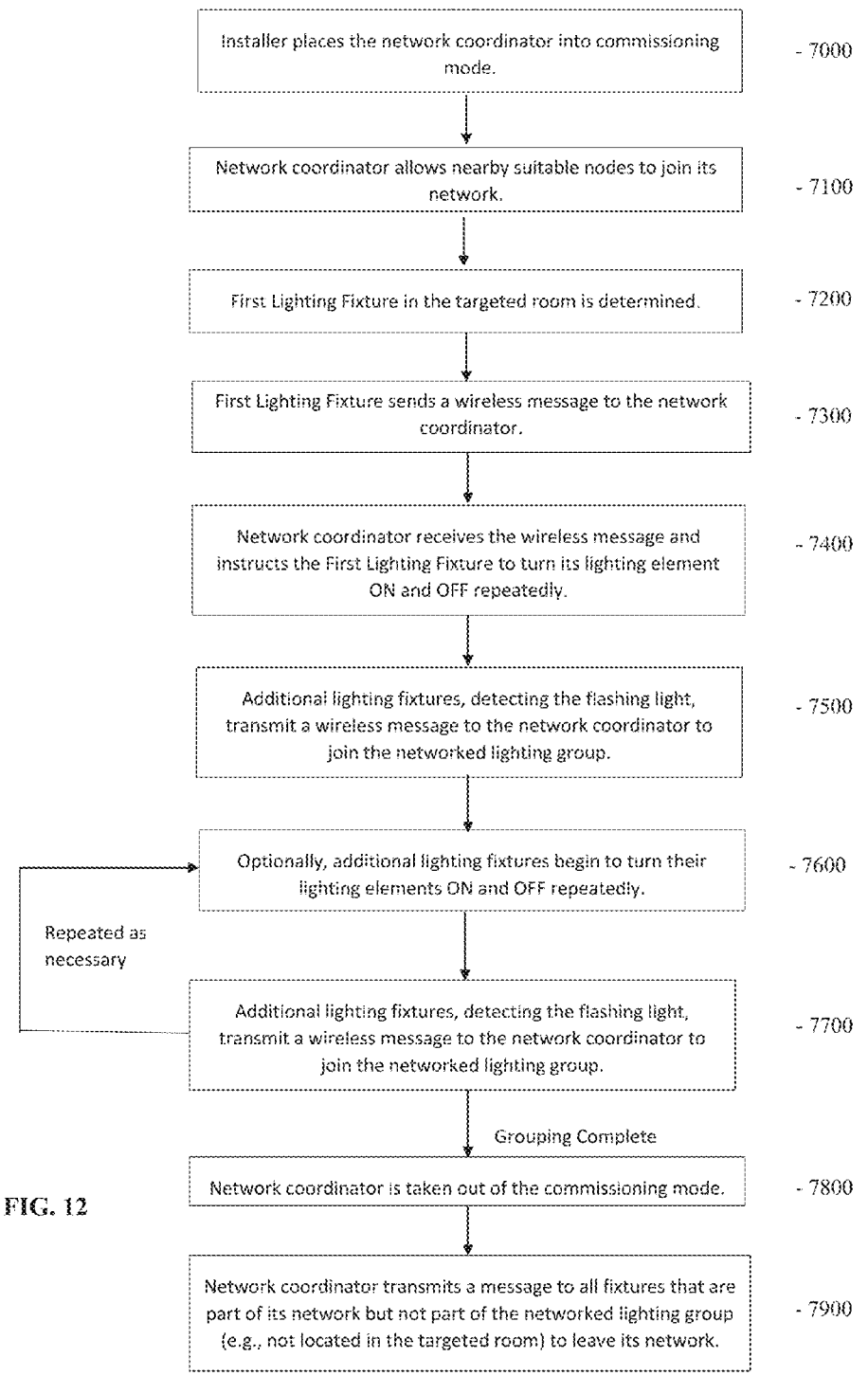
FIG. 12 is a logic diagram illustrating an alternate preferred embodiment of the disclosed method.

Alternatively, referring to FIG. 12, at 7000, the installer may place the network coordinator (located in either the room controller 10 (FIGS. 1, 2A and 2B) or in the coordinator lighting fixture $102_1$ (FIGS. 4 and 5)) into a commissioning mode. This may be accomplished by any process described herein or known. For example, the installer may place the network coordinator into commissioning mode by sending a wireless message to the room controller via a remote device, via a button or key press at the entry station, etc.

At 7100, the network coordinator allows nearby suitable nodes (e.g., lighting fixtures) that are not currently joined to another network coordinator to join its network. This may be accomplished by any process described herein or known. For example, as previously described, a plurality of lighting fixtures may send respective individual wireless messages or beacons to the network coordinator (e.g., first transceiver of entry station). Presumably, as previously described, at least a subset of the plurality of lighting fixtures may be installed in a targeted room (the targeted room being the room or area in which it is intended that a plurality of the lighting fixtures be formed into a networked lighting group for unitary configuration and control). In some embodiments, the wireless messages may include a serial number or other identifier associated with each of the lighting fixtures sending the message. In some embodiments, as previously described, the plurality of lighting fixtures may send the respective individual wireless messages upon being powered up or turned on, and may continue to send the wireless messages until they have been added to the lighting network. In other embodiments, as previously described herein, the plurality of lighting fixtures may send the respective individual wireless messages upon triggering of the lighting fixture's occupancy sensing element (i.e., when the occupancy sensing element senses movement, which in one embodiment is the presence of a person in the targeted room) or by detecting a pulsing light level at the fixture's light sensing element. In still further embodiments, the network coordinator may transmit a wireless activation message to a plurality of lighting fixtures after being prompted by the installer. The wireless activation message may include a command to each of plurality of lighting fixtures instructing them to send the respective individual wireless messages. As previously described, the network coordinator may be prompted to send the wireless activation message via a button or key press at the entry station, or via a remote device communicating, for example, with a second transceiver associated with of the entry station. In some embodiments, a status indicator associated with each of the plurality of lighting fixtures may light up or change brightness when the wireless messages are sent from each of the plurality of lighting fixtures. In other embodiments the status indicator may blink, dim or shine with greater intensity. This may enable an installer to confirm that all of the lighting fixtures in the targeted room are sending wireless signals to the network coordinator. As such, all nearby suitable nodes (e.g., lighting fixtures) that are not a member of a room, join the network of the room controller.

The network coordinator receives the wireless messages from the plurality of lighting fixtures and creates an inventory of lighting fixtures. The network coordinator may include all of the responding lighting fixtures and stores a list of the responding lighting fixtures in memory.

At 7200, with the network coordinator in commissioning mode, a lighting fixture may be selected to be the "first lighting fixture" of the networked lighting group in the targeted room. This may be accomplished by any process described herein or known. For example, as described in connection with FIG. 8, the installer may shine a flashlight, a predetermined coded set of pulses, a unique lighting pattern of, for example, fade UP and fade DOWN, etc. at the light sensing element of one of the lighting fixtures located in the targeted room. Alternatively, as previously described, the "first lighting fixture" may be identified by signal strength, and confirmed by visual indication, etc. In response, at 7300, the processor associated with the targeted lighting fixture may instruct its transceiver to send a wireless message to the network coordinator requesting that the lighting fixture be deemed the first lighting fixture of the networked lighting group. For example, the processor associated with the targeted lighting fixture may determine that the light sensing element has received the predetermined light pulse, and in turn, may instruct its transceiver to send a wireless message to the network coordinator requesting that the lighting fixture be deemed the first lighting fixture of the networked lighting group. At 7400, the network coordinator may receive the wireless message and instructs the first lighting fixture to turn its lighting element ON and OFF repeatedly.

At 7500, if additional lighting fixtures detect, via their light sensing element, the flashing light from the first lighting fixture turning its lighting element ON and OFF, or detects an increase in ambient light level from the first lighting fixture illuminating its lighting element, then the additional lighting fixtures may transmit a wireless message to the network coordinator requesting to join the networked lighting group. Presumably, if the additional lighting fixtures detect the first lighting fixture turning its lighting element ON and OFF, or an increase in detected light level from the illumination of the lighting element of the first lighting fixture, then the additional lighting fixtures are presumed to be located in the targeted room. These additional lighting fixtures, in return, may transmit a wireless message to the network coordinator requesting that the additional lighting fixtures be included into the networked lighting group.

In addition, optionally, at 7600 the network coordinator may receive the wireless message from the additional lighting fixtures and instruct the additional lighting fixtures to turn its lighting element ON and OFF repeatedly. At 7700, if any additional lighting fixtures detect, via their light sensing element, the flashing light from the additional lighting fixtures turning their lighting elements ON and OFF, or detect an increase in ambient light level from the additional lighting fixtures illuminating their lighting elements, then the additional lighting fixtures may transmit a wireless message to the network coordinator requesting that these additional lighting fixtures be included into the networked lighting group. This process may be repeated as often as required until all of the lighting fixtures in the room have been included into the networked lighting group. For example, this process may be repeated for a predetermined period of time, or until terminated automatically after a period of time or manually by the installer.

A full list of lighting fixtures in the targeted room can then be maintained by the network coordinator. To confirm this, the network coordinator may transmit a wireless message to all of the lighting fixtures in the networked lighting group to illuminate their light elements in unison. Alternatively, the network coordinator may instruct all of the lighting fixtures in the networked lighting group to flash their lighting elements sequentially. Other features such as a fade up or down in light intensity can also be instructed, with all lighting fixtures in the networked lighting group responding to fade up and/or down. Thereafter, as necessary, the installer can add additional lighting fixtures located in the targeted room or remove one or more lighting fixtures as necessary. This may be accomplished by any process described herein or known.

At 7800, the network coordinator may be taken out of commissioning mode by any method described herein. For example, the installer may press a button on the entry station, send a command from the remote device, or expiration of a timeout period informs the network coordinator to stop the commissioning process. Finally, at 7900, the network coordinator will then send a message to all fixtures that are part of its network but not part of the networked lighting group to leave its network.

Thus, for example, in one example embodiment, the network coordinator may compile a list of all nearby lighting fixtures. Each lighting fixture may be preprogrammed to detect, for example, a flashing light, a coded set of light pulses, etc. Next, the installer places the network coordinator into commissioning mode and selects the first lighting fixture in the room via any method disclosed herein. Thereafter, the first lighting fixture may begin to, for example, turn ON and OFF its lighting element in a flashing manner. Each lighting fixture detecting the flashing light via its associated light sensing element, would then send a wireless message to the network coordinator requesting that it be permitted to join the networked lighting group. In addition, each lighting fixture detecting the flashing light may also begin turning ON and OFF its lighting element in a flashing manner. Each additional lighting fixture detecting the flashing light via its associated light sensing element, would then send a wireless message to the network coordinator requesting that it be permitted to join the networked lighting group and each additional lighting fixture detecting the flashing light may also begin turning ON and OFF its lighting element in a flashing manner. This process may be repeated as necessary, until all lighting fixtures in the room have joined the networked lighting group. The network coordinator receiving all of the wireless messages from the plurality of lighting fixtures creates and maintains an inventory of lighting fixtures in the networked lighting group. Thereafter, the network coordinator is capable of controlling all of the lighting fixtures in the networked lighting group. In this way, small to medium sized rooms could be commissioned in a faster and more-efficient manner.

Figure 13:
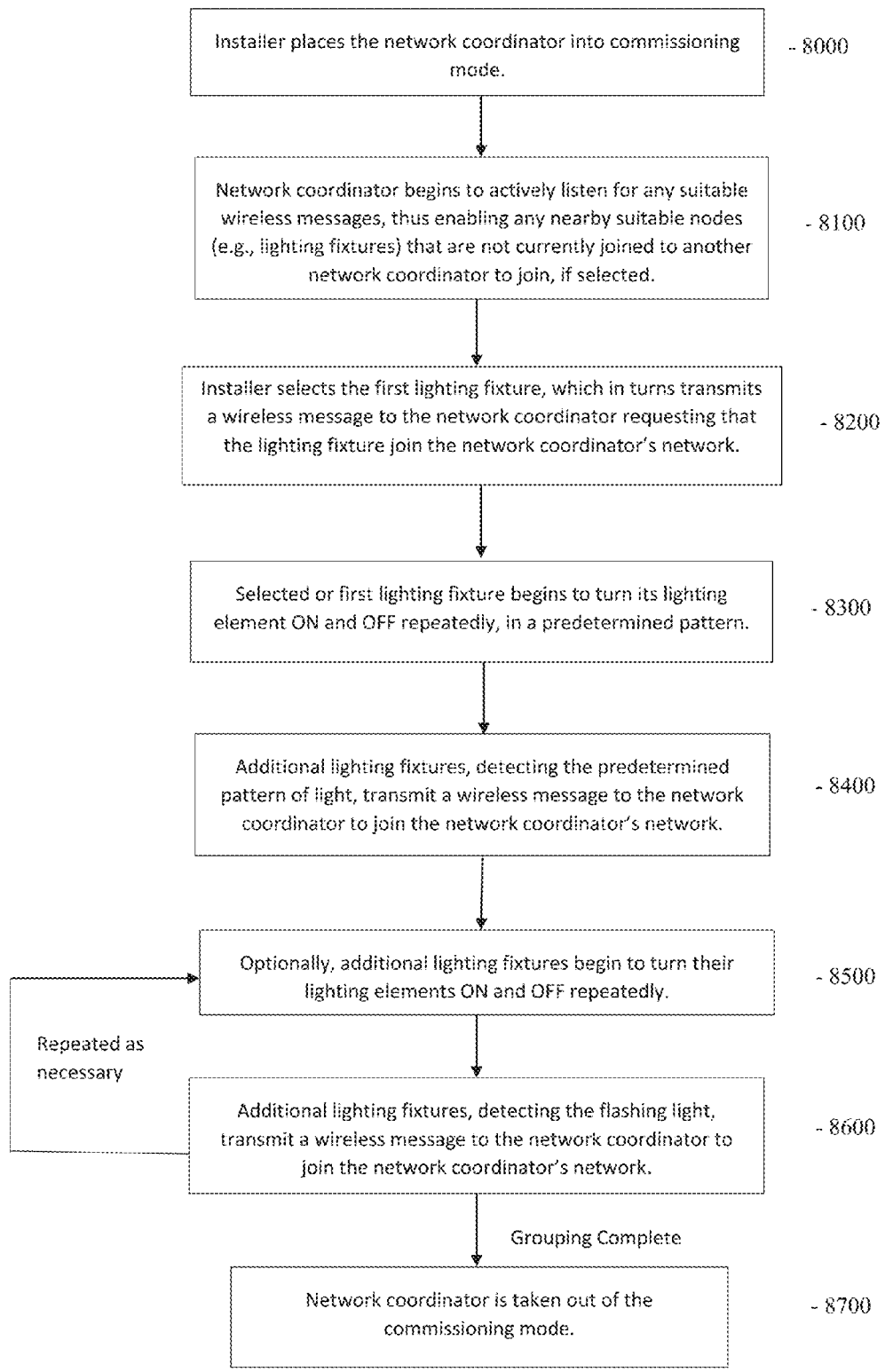
FIG. 13 is a logic diagram illustrating an alternate preferred embodiment of the disclosed method.

As another alternate embodiment, referring to FIG. 13, at 8000, the installer may place the network coordinator (located in either the room controller 10 (FIGS. 1, 2A and 2B) or in the coordinator lighting fixture $102_1$ (FIGS. 4 and 5)) into a commissioning mode. This may be accomplished by any process described herein or known. For example, the installer may place the network coordinator into commissioning mode by sending a wireless message to the room controller via a remote device, via a button or key press at the entry station, etc.

At 8100, the network coordinator allows nearby suitable nodes (e.g., lighting fixtures) that are not currently joined to another network coordinator to join, if selected at 8200, 8400, or 8600 (as will be described below). That is, the network controller is actively listening for any suitable wireless messages. In this embodiment, any node joining the network coordinator's network are considered to be part of the networked lighting group for unitary configuration and control. At 8200, the first lighting fixture is manually selected to join the network coordinator's network. Manually selection of the first lighting fixture may be accomplished by any method known or described herein. For example, the first lighting fixture may be selected by modulating a light level that is detected by the light sensing element of the desired node. That is, as previously described, the installer may shine a flashlight, a predetermined coded set of pulses, a unique lighting pattern of, for example, fade UP and fade DOWN, etc. at the light sensing element of one of the lighting fixtures located in the targeted room. Alternatively, the installer could push a button on the fixture, or trigger the lighting fixture's occupancy sensor, etc. In response, the processor associated with the manually selected or first lighting fixture may instruct its transceiver to send a wireless message to the network coordinator requesting that the lighting fixture join the network coordinator's network. For example, the processor may determine that the light sensing element has received the predetermined light pulse, and in turn, may instruct its transceiver to send a wireless message to the network coordinator requesting that the lighting fixture join the network coordinator's network.

At 8300, upon joining the network coordinator's network, the manually selected or first lighting fixture may, for example, brighten and dim or turn ON and OFF its lighting element repeatedly in a predetermined pattern, as previously described. This may be initiated within the fixture node upon joining the network coordinator's network or may be initiated by the network coordinator sending a message to the selected or targeted lighting fixture.

At 8400, if additional lighting fixtures detect, via their light sensing element, the predetermined pattern of light level changes from the first lighting fixture, then the additional lighting fixtures may transmit a wireless message to the network coordinator requesting to join the network coordinator's network, as previously described.

At 8500, upon joining the network coordinator's network, the additional lighting fixtures may also begin to brighten and dim or turn ON and OFF its lighting element repeatedly in a predetermined pattern as previously described. This may be initiated within the fixture upon joining the network coordinator's network or may be initiated by the network coordinator sending a message to the additional lighting fixture. When more than one lighting fixture has joined the network coordinator's network, the fixtures may operate their lighting elements in a predetermined pattern in unison or sequentially by each fixture.

Presumably, if additional lighting fixtures detect the predetermined pattern of light level changes from nearby lighting fixtures within visible range, then the additional lighting fixtures are presumed to be located in the targeted room. Therefore, at 8600, if any additional lighting fixtures detect, via their light sensing element, the predetermined pattern of light level changes from nearby lighting fixtures, then the additional lighting fixtures may transmit a wireless message to the network coordinator requesting that these additional lighting fixtures join the network coordinator's network. This process may be repeated as often as required until all of the lighting fixtures in the room have been included into the network coordinator's network. For example, this process is repeated until no further lighting fixtures detect the light level changes and join the network coordinator's network or until terminated automatically after a period of time or manually by the installer.

As previously mentioned, in this embodiment all nodes that have joined the network coordinator's network are considered part of the networked lighting group. A full list of lighting fixtures in the targeted room can then be maintained by the network coordinator. To confirm this, the network coordinator may transmit a wireless message to all of the lighting fixtures in the networked lighting group to illuminate their light elements in unison. Alternatively, the network coordinator may instruct all of the lighting fixtures in the networked lighting group to flash their lighting elements sequentially. Other features such as a fade up or down in light intensity can also be instructed, with all lighting fixtures in the networked lighting group responding to fade up or down. Thereafter, as necessary, the installer can add additional lighting fixtures located in the targeted room or remove one or more lighting fixtures as necessary. This may be accomplished by any process described herein or known. Finally, at 8700, the network coordinator may be taken out of commissioning mode by any method described herein. The network coordinator will stop accepting nodes to join its network and send a message to all fixtures that are part of its network to stop changing light levels in a predetermined pattern and resume normal operation as part of the network coordinator's networked lighting group.

Figure 9:
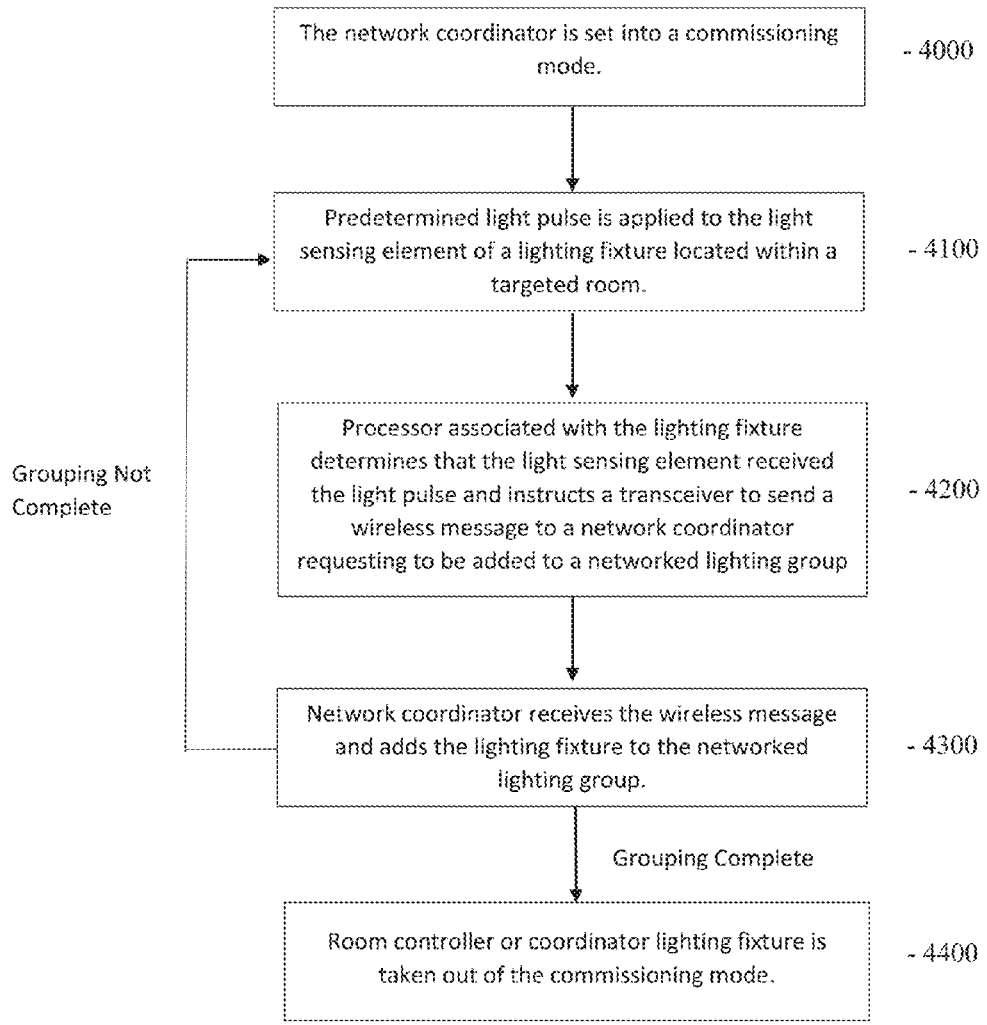
FIG. 9 is a logic diagram illustrating a fourth preferred embodiment of the disclosed method.

As a further alternative embodiment to the previously described automated commissioning process, as described in FIG. 9, a fourth preferred embodiment of the method for grouping lighting fixtures is disclosed. In this method, an installer preferably places the network coordinator (located in either the room controller 10 (FIGS. 1, 2A and 2B) or in the coordinator lighting fixture $102_1$ (FIGS. 4 and 5)) into commissioning mode. This may be accomplished by any process described herein or known. For example, the installer may place the network coordinator into commissioning mode by sending a wireless message to the room controller via a remote device, via a button or key press at the entry station, etc. With the network coordinator in commissioning mode, the installer can walk through the targeted room, fixture by fixture, and simply provide a light flash to the light sensing element 14 of each lighting fixture $2_{1-n}$ located in the targeted room. As mentioned, such a light "flash" can comprise a single light flash or a predetermined coded set of light pulses and/or may comprise light in the non-visible spectrum. Each "flashed" lighting fixture may then send a message to the network coordinator in the room controller 10 or the network coordinator lighting fixture $102_1$ informing the network coordinator that the flashed light should be added to the group of lighting fixtures in the targeted room.

Thus, at 4000 the room controller or coordinator lighting fixture may be set into a commissioning mode. This may be accomplished by any mechanism herein described or known. For example, the installer my place the room controller 10 into commissioning mode by sending a wireless message to the room controller via a remote device, via a button or key press at the entry station, etc. At 4100, a predetermined light pulse may be applied to the light sensing element of a lighting fixture located within a targeted room. At 4200, the processor associated with the lighting fixture may determine that the light sensing element has received the predetermined light pulse, and in turn, may instruct its transceiver to send a wireless message to the network coordinator requesting that the lighting fixture be added to the networked lighting group. At 4300, the network coordinator may receive the wireless message and may add the lighting fixture to the networked lighting group. If additional lighting fixtures in the targeted room are to be added to the networked lighting group, then steps 4100-4300 can be repeated until all desired lighting fixtures in the targeted room have been added to the networked lighting group. Once all desired lighting fixtures have been added to the networked lighting group, at 4400 the room controller or coordinator lighting fixture may be taken out of the commissioning mode. This may be accomplished by any process described herein or known. For example, if the network coordinator does not receive a wireless message for a predetermined period of time or a timeout period, the network coordinator may be taken out of the commissioning mode. Alternatively, the network coordinator can be taken out of commissioning mode by, for example, by sending a wireless message to the network coordinator via a remote device, via a button or key press at the entry station, etc.

Further, it is contemplated that once a networked lighting group is formed (and the room controller instructs the lighting fixtures in the group to TURN ON, TURN OFF, DIM UP, or DIM DOWN the lights as a group) that one or more lighting fixtures in the targeted room may not have been added to the group or one or more lighting fixtures not in the targeted room may have been included in the group. That is, the self-commissioning processes described herein, may accidentally include a lighting fixture that is not located in the targeted room or may accidentally omit a lighting fixture that is in the targeted room. To this end, in combination with any of the methods described herein, at the end of the self-commissioning process, an installer may notice that a lighting fixture in the targeted room has not been included in the group of lighting fixtures. As such, the installer may place the network coordinator into the commission mode and then walk through the targeted room and provide a light flash sequentially to each of the light sensing elements of the lighting fixtures located in the targeted room that was inadvertently omitted from the networked lighting group for one reason or another. Each "flashed" lighting fixture may then send a message to the network coordinator associated with the room controller 10 or the network coordinator lighting fixture $102_1$ informing the network coordinator that the flashed light should be added to the networked lighting group. Similarly, for any fixtures that were inadvertently included in the group of lighting fixtures, for example, for any fixture that is not located in the targeted room but for one reason or another was grouped by the self-commissioning process, the installer can provide a light flash sequentially to each of the light sensing elements of the lighting fixtures located outside of the targeted room that was inadvertently included in the networked lighting group to send a message to the room controller 10 or the network coordinator lighting fixture $102_1$ informing the network coordinator that the flashed light should be removed from the group of lighting fixtures in the targeted room. The process of adding or removing fixtures can be distinguished by any means known. For example, when placing the network coordinator into commissioning mode, the installer can instruct the network coordinator that the following fixture should be added to the network by pressing or sending one message while instructing the network coordinator to remove fixtures by pressing or sending a second wireless message on, for example, the remote device. Alternatively, different coded sets of light pulses can be used to add or remove a fixture from the network, etc.

Figure 10:
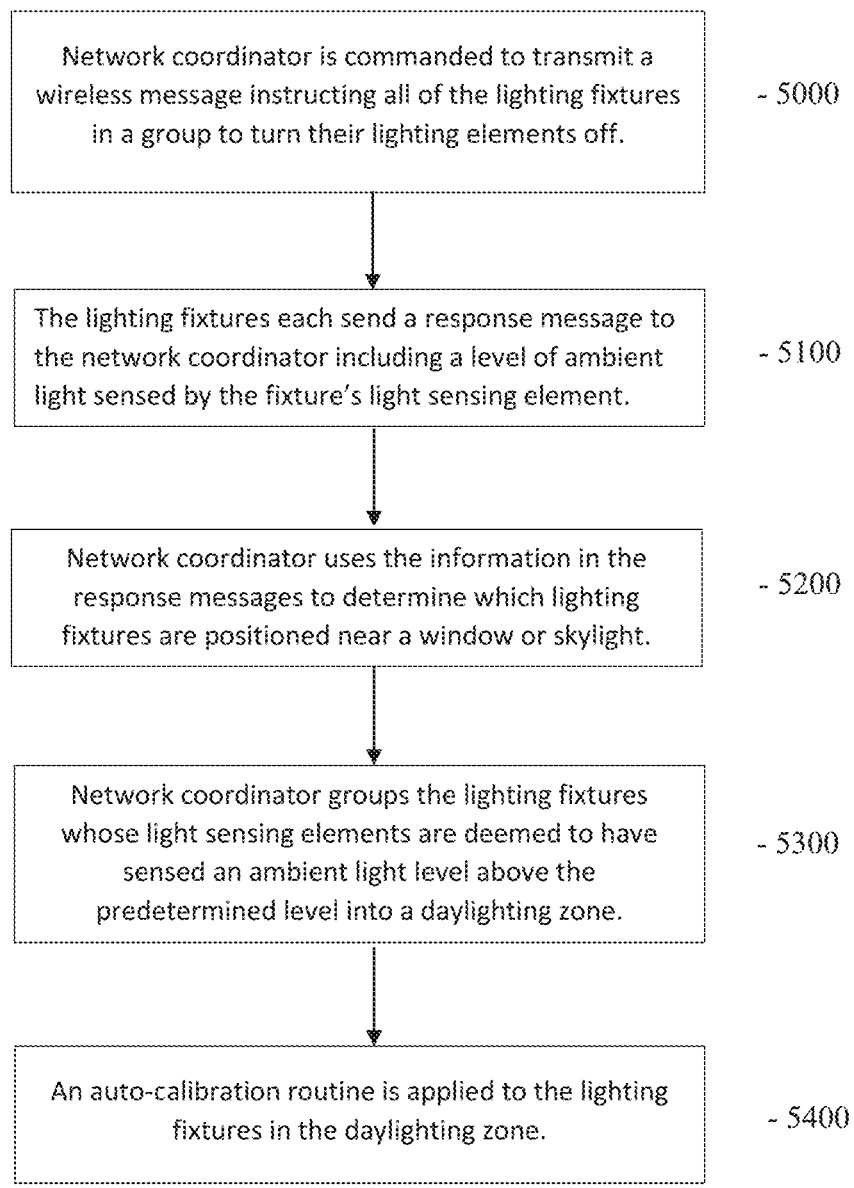
FIG. 10 is a logic diagram illustrating a fifth preferred embodiment of the disclosed method.

FIG. 10 is a logic diagram illustrating a fifth preferred embodiment of the disclosed method incorporating daylight calibration. In some embodiments, once a room "group" is established using one of the previously described method, one or more zones within the group can be formed based on the amount of ambient light detected. As will be appreciated, the lighting fixtures in these additionally formed zones may be controlled differently from the lighting fixtures outside of these zones. An example of one such zone is a "daylighting" zone, which refers to a zone of lighting fixtures that may be located near a window, skylight or other source of natural light. In such daylighting zones there may be less need for artificial light (light from the lighting fixtures in the zone) to maintain the ambient light level in the zone at a predetermined minimum value. With prior systems such lighting fixtures would have to be added to the zone by an installer using a configuration programmer. The installer would walk through the room and manually select the lighting fixtures desired to be included in the daylighting zone.

The present method describes a process for automatically forming such a daylighting zone (or zones) using the light sensing elements associated with each of the lighting fixtures in the group. Once the lighting fixtures located in the targeted room are established as being part of the group, at step 5000 the network coordinator may be commanded to transmit a wireless message (via a user pressing a button, soft key input or other wired or wireless data entry feature, or via a remote device) instructing all of the lighting fixtures in the group to turn their lighting elements off. At step 5100, the lighting fixtures may, in response, also each send a wireless response message to the network coordinator including information about what level of ambient light is currently being sensed by the lighting fixture's light sensing element. The wireless response message may also include identifying information about the lighting fixture sending the message, such as a serial number or other identification number. At step 5200 the network coordinator may use the information in the response messages to determine which of the lighting fixtures in the group are positioned near a window or skylight. In one embodiment, if the response message includes information indicating the light sensing element of a particular lighting fixture has sensed an ambient light level above a predetermined level, that lighting fixture may be assumed to be near a window or skylight and thus the lighting fixture can be placed in a "daylighting zone." At step 5300, the network coordinator may group the lighting fixtures whose light sensing elements are deemed to have sensed an ambient light level above the predetermined level into a daylighting zone. At 5400 an auto-calibration routine may then be applied to the lighting fixtures in the daylighting zone. An example of one appropriate auto-calibration routine is described in U.S. Pat. No. 7,608,807 to Hick et al., and assigned to Leviton Manufacturing Co., Inc., the entire disclosure of which is incorporated herein in its entirety.

Generally speaking, U.S. Pat. No. 7,608,807, describes a procedure where the lighting fixtures in a daylight zone are turned on for a defined period of time, for example, 24 hours. During this time, preferably the user will be prohibited from turning the lighting fixtures off. For example, the entry station will be incapable of turning off the lighting fixtures. Preferably, during this time, the status indicator is preferably on to alert users that the system is in a daylighting determination period.

During this time, the lighting fixtures may transmit their ambient light levels to the network coordinator. The network coordinator preferably keeps track of the lowest ambient light level measured during the predefined period of time. At the end of the predefined period of time, the lowest level from each of the lighting fixtures is saved by the network coordinator. The lowest level measured presumably occurs during the night when the only light measured by the light sensing element is that from the lighting fixtures (e.g., at nighttime, it is presumed that there will be no natural light entering thru the windows). The lowest level measured may be set as the target level for daylighting. Note that the level for each lighting fixture within a daylighting zone may be slightly different. As such, the network coordinator may average the lowest measured light levels in a daylighting zone to establish an averaged target value for the daylight zone. After the expiration of the predefined period of time, the network coordinator may exit the auto commissioning mode and begin normal operation.

In an alternate embodiment, rather than turning all of the lighting fixtures in a daylight zone to full on for a predefined period of time, the lighting fixtures may be permitted to operate normally. In this embodiment, the installer/user may enter a specific, preferred time of day, for example, at an APP running on a remote device. The time of day may be transmitted to the network coordinator and saved in memory. When the time of time occurs, regardless of the state of the lighting fixtures, the network coordinator may transmit a wireless message instructing all of the lighting fixtures in a daylight zone to turn on for a predefined, brief period of time, for example, 5 to 10, seconds. During this predefined period of time, the light sensing element may read the ambient light levels. As with the approach previously described, the measured ambient light levels from each lighting fixture may be transmitted to the network coordinator and stored. In addition, the network coordinator may average the measured ambient light levels from each lighting fixture in a daylight zone and establish an averaged target value for the daylight zone.

Additionally, and as a further alternative, as described in connection with FIGS. 8 and 9 above, a light flash can be provided to the light sensing element(s) of one or more of the lighting fixtures to start the auto-calibration process of a daylighting routine for the lighting fixtures in the targeted room. Alternatively, and as a further alternative, a light flash can be provided to the light sensing element of one or more lighting fixtures to create or place/remove a fixture from a zone.

Figure 11:
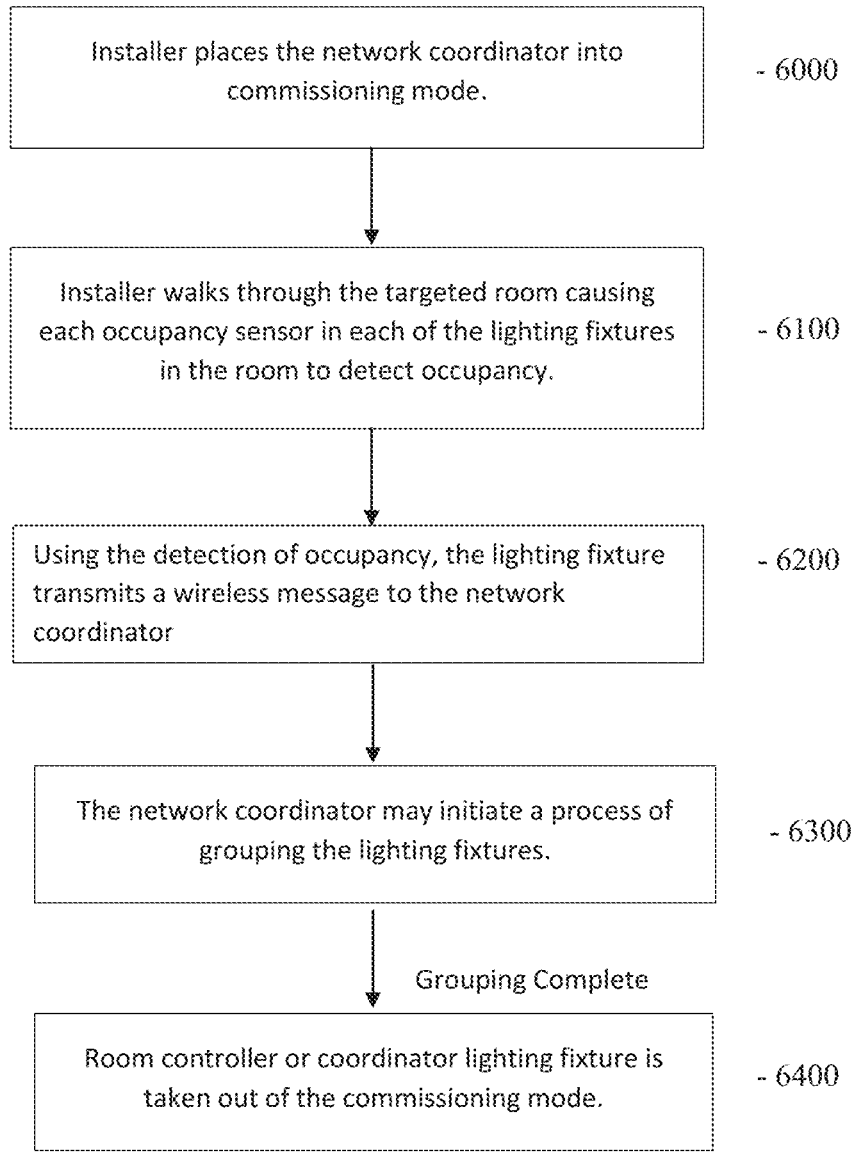
FIG. 11 is a logic diagram illustrating a sixth preferred embodiment of the disclosed method.

FIG. 11 is a logic diagram illustrating a sixth preferred embodiment of forming a group of network lighting fixtures. As previously described, the plurality of lighting fixtures $2_{1-n}$ may send the respective individual wireless messages upon triggering of the lighting fixture's occupancy sensing element 14 (i.e., when the occupancy sensing element senses movement, which in one embodiment is the presence of a person in the targeted room 30). For example, an installer may walk through the targeted room 30 to cause the plurality of lighting fixtures $2_{1-n}$ to send the respective individual wireless messages. Using the occupancy sensing element to trigger the sending of respective individual wireless messages may have an advantage in that it can reduce the total number of lighting fixtures allowed to initially join the network as compared to arrangements in which all lighting fixtures automatically send their individual wireless messages upon powering up or in response to a wireless message received from the network coordinator. In the latter cases it may be expected that lighting fixtures in adjacent rooms and/or spaces would be allowed initially to join the network, and would thus require subsequent removal from the network using one or more of the methods disclosed herein. By using the occupancy sensing element to trigger the sending of wireless messages from a lighting fixture, lighting fixtures in adjacent rooms and/or spaces would not initially join the network, which would reduce the total number of lighting fixtures that would have to be removed later.

More specifically, at 6000, an installer preferably places the network coordinator (located in either the room controller 10 (FIGS. 1, 2A and 2B) or in the coordinator lighting fixture $102_1$ (FIGS. 4 and 5)) into commissioning mode. This may be accomplished by any process described herein or known. For example, the installer my place the room controller into commissioning mode by sending a wireless message to the room controller via a remote device, via a button or key press at the entry station, etc. At 6100, with the network coordinator in commissioning mode, the installer can walk through the targeted room. The processor associated with each lighting fixture may determine that occupancy has been detected, and in turn, at 6200, each lighting fixture detecting occupancy may send a message to the network coordinator in the room controller 10 or the network coordinator lighting fixture $102_1$ informing the network coordinator that the lighting fixture should be added to the group of lighting fixtures in the targeted room. At 6300, the network coordinator may receive the wireless message and may add the lighting fixture to the networked lighting group. Once all desired lighting fixtures have been added to the networked lighting group, at 6400 the room controller or coordinator lighting fixture may be taken out of the commissioning mode. This may be accomplished by any process described herein or known. For example, if the network coordinator does not receive a wireless message for a predetermined period of time or a timeout period, the network coordinator may be taken out of the commissioning mode. Alternatively, the network coordinator can be taken out of commissioning mode by, for example, by sending a wireless message to the network coordinator via a remote device, via a button or key press at the entry station, etc.

Further, it is contemplated that once a networked lighting group is formed (and the room controller instructs the lighting fixtures in the group to TURN ON, TURN OFF, DIM UP, or DIM DOWN the lights as a group) that one or more lighting fixtures in the targeted room may not have been added to the group or one or more lighting fixtures not in the targeted room may have been included in the group. That is, the self-commissioning processes described herein, may accidentally include a lighting fixture that is not located in the targeted room or may accidentally omit a lighting fixture that is in the targeted room. To this end, in combination with any of the methods described herein, at the end of the self-commissioning process, an installer may notice that a lighting fixture in the targeted room has not been included in the group of lighting fixtures. As such, the installer may place the network coordinator into the commission mode and then walk through the targeted room again targeting each of the occupancy sensing elements of the lighting fixtures located in the targeted room that was inadvertently omitted from the networked lighting group for one reason or another. Each lighting fixture may then send a message to the network coordinator associated with the room controller 10 or the network coordinator lighting fixture 102₁ informing the network coordinator that the light fixture should be added to the networked lighting group. The process of adding or removing fixtures can be distinguished by any means known. For example, when placing the network coordinator into commissioning mode, the installer can instruct the network coordinator that the following fixture should be added to the network by pressing or sending one message while instructing the network coordinator to remove fixtures by pressing or sending a second wireless message on, for example, the remote device.

It will be appreciated that the disclosed methods can include combinations of the previously-described techniques for forming one or more networked lighting groups comprising a plurality of lighting fixtures. For example, in some embodiments one or more lighting fixtures may be prompted to send a wireless message to a network coordinator based on more than one criteria being satisfied. In one embodiment a combination of light flashes (to be sensed by a lighting fixture's light sensing element) and movement (to be sensed by the lighting fixture's occupancy sensing element) may be required in order for a lighting fixture to send a wireless message to the network coordinator requesting to be added to a networked lighting group. Other combinations will be understood by one of ordinary skill in the art and are contemplated by the disclosure. It will be appreciated that such combination criteria may minimize the total number of lighting fixtures asking to initially join the networked lighting group so that fewer lighting fixtures located outside a targeted room will initially be joined to the group.

Some embodiments may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. By way of example, such a machine may include, but not limited to, any suitable processing platform, computing platform, computing, processing, computing system, processing system, computer, processor, or the like, and may be implemented using any suitable combination of hardware and/or software. The computer-readable medium or article may include, but not limited to, any suitable type of memory unit, memory, memory article, memory medium, storage, storage article, storage medium and/or storage unit, for example, memory (including, but not limited to, non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A system for commissioning a network of lighting fixtures, comprising:
  a plurality of lighting fixtures, each of the plurality of lighting fixtures including: a lighting element;
    an identifier unique to each of said plurality of lighting fixtures;
    a sensor module associated with at least one of the lighting elements, the sensor module including an occupancy sensing element, a light sensing element and a first transceiver; and
  a network coordinator comprising a second transceiver, the network coordinator configured to discover, group and control a portion of the plurality of lighting fixtures by communicating with the first transceivers of each of the plurality of lighting fixtures;
  wherein the network coordinator includes a processor programmed to:
    receive, via the second wireless transceiver, respective wireless messages sent from each of the plurality of lighting fixtures, each of the respective wireless messages including the identifier associated with the respective lighting fixture;
    determine a respective signal strength associated with each of said respective wireless messages; and
    rank each of the plurality of lighting fixtures according to the determined signal strength.

2. The system of claim 1, wherein each of the plurality of lighting fixtures further includes a housing, the housing including the lighting element and the sensor module disposed.

3. The system of claim 1, further comprising a third transceiver associated with the network coordinator, the third transceiver for receiving wireless messages from a remote device for controlling an operational function of the network coordinator.

4. The system of claim 3, wherein the network coordinator is a ZigBee coordinator, the first transceiver of each of the plurality of lighting fixtures comprises a ZigBee transceiver, and the third transceiver is a Bluetooth low energy (BLE) transceiver.

5. The system of claim 1, wherein the network coordinator is disposed in an entry station associated with a room, the room containing at least a portion of the plurality of lighting fixtures.

6. The system of claim 1, wherein the network coordinator is disposed in one of said plurality of lighting fixtures.

7. The system of claim 1, wherein each of the plurality of lighting fixtures further comprises a processor programmed to send a respective one of said respective wireless messages upon a powering up of said lighting fixture.

8. The system of claim 1, wherein the processor of said network coordinator is programmed to command the second transceiver to send a wireless activation signal to the first transceivers of each of the plurality of lighting fixtures, the wireless activation signal configured to command the first wireless transceivers to send the respective wireless messages.

9. The system of claim 1, wherein the processor of said network coordinator is programmed to add each of the plurality of lighting fixtures, from which a respective wireless message is received, to a networked lighting group.

10. The system of claim 9, wherein the processor of said network coordinator is programmed to selectively command, via the second transceiver, each of said lighting fixtures to illuminate their respective lighting elements, based on the determined ranking.

11. The system of claim 10, wherein the processor of said network coordinator begins said selective commanding in response to a user input selected from a list consisting of a light flash, a button press on an entry station, and a wireless signal from a remote device.

12. The system of claim 1, wherein each of the plurality of lighting fixtures send a plurality of said respective messages.

13. The system of claim 1, wherein the sensor module is directly coupled to the lighting element, the lighting element comprising a light source connected to a driver or a light source having an integral driver.

14. The system of claim 1, wherein the network coordinator is disposed in a room controller associated with a room in which at least some of the plurality of lighting fixtures are disposed.

15. A method for commissioning a networked lighting system, comprising:
sending, from a plurality of lighting fixtures, respective wireless messages to a network coordinator associated with an area, each of the respective wireless messages including an identifier associated with the respective lighting fixture;
receiving, at the network coordinator, the respective wireless messages;
determining, at the network coordinator, a respective signal strength associated with each of said respective wireless messages;
ranking each of the plurality of lighting fixtures according to the determined signal strength;
sending, from the network coordinator, a wireless message to a highest ranked one of said plurality of lighting fixtures, the wireless message instructing the highest ranked one to illuminate an associated lighting element;
determining whether said illuminated lighting element is located within the area; and
keeping the highest ranked one in a networked lighting group if said illuminated lighting element is determined to be located within the area, or removing the highest ranked one from said networked lighting group if said illuminated lighting element is determined not to be located within the area.

16. The method of claim 15, wherein the step of sending respective wireless messages to a network coordinator is in response to a light flash provided to a light sensing element associated with each of said plurality of lighting fixtures.

17. The method of claim 15, wherein the step of sending respective wireless messages to a network coordinator is in response to an occupancy condition sensed by an occupancy sensing element associated with each of said plurality of lighting fixtures.

18. The method of claim 15, wherein the step of sending respective wireless messages to a network coordinator is in response to a wireless activation message sent by the network coordinator.

19. The method of claim 18, wherein the network coordinator is disposed within the entry station.

20. The method of claim 19, the entry station further comprising a wireless transceiver for communicating with a remote device, the remote device running an application configured to enable a user to control at least one aspect of the entry station.

21. The method of claim 18, wherein the network coordinator is disposed within a housing of one of the plurality of lighting fixtures.

22. The method of claim 21, the one of the plurality of lighting fixtures further comprising a wireless transceiver for communicating with a remote device, the remote device running an application configured to enable a user to control at least one aspect of the one of the plurality of lighting fixtures.

23. The method of claim 15, wherein the step of sending respective wireless messages to a network coordinator is in response to a powering up of each of said plurality of lighting fixtures.

24. The method of claim 15, further comprising, before the step of sending, from the network coordinator, a wireless message to a highest ranked one of said plurality of lighting fixtures, adding each of the plurality of lighting fixtures, from which the respective wireless messages have been received by the network coordinator, to a networked lighting group.

25. The method of claim 15, wherein the steps of sending, from the network coordinator, a wireless message to a highest ranked one of said plurality of lighting fixtures and determining whether said illuminated lighting element is located within the area are repeated until one of the plurality of lighting fixtures in the ranked list is determined to be in the area, wherein network coordinator keeps the lighting fixture illuminating its lighting element in the networked lighting group and identifies it as the first grouped lighting fixture.

26. The method of claim 25, wherein determining whether said illuminated lighting element is located within the area is performed by an installer.

27. The method of claim 26, the installer confirms that the illuminated lighting fixture is located within the area by pressing a button, soft key or other data entry feature on an entry station.

28. The method of claim 26, the installer confirms that the illuminated lighting fixture is located within the area by pressing a button on a remote device.

29. The method of claim 15, further comprising:
sending, from the network coordinator, a wireless message to a second highest ranked lighting fixture of said plurality of lighting fixtures, the wireless message instructing the second highest ranked lighting fixture to illuminate an associated lighting element;
determining whether said lighting element associated with said second highest ranked lighting fixture is located within the area; and
keeping the second highest ranked one in the networked lighting group if said illuminated lighting element is determined to be located within the area, or removing the second highest ranked lighting fixture from the networked lighting group if said illuminated lighting element is determined not to be located within the area.

30. The method of claim 29, wherein sending, from the network coordinator, a wireless message instructing the second highest ranked lighting fixture to illuminate an associated lighting element comprises instructing the second highest ranked lighting fixture to cycle its lighting element through a series of on and off cycles.

31. The method of claim 29, wherein the step of determining whether the lighting element associated with the second highest ranked lighting fixture is located within the area comprises sensing, at a light sensing element associated with one of said plurality of lighting fixtures, whether an ambient light level is increased when the lighting element associated with the second highest ranked lighting fixture is illuminated.

32. The method of claim 29, wherein when light sensing element of the first highest ranked lighting fixture determines the ambient light level to have increased when the lighting element associated with the second highest ranked lighting fixture is illuminated, wherein the network coordinator keeps the second highest ranked lighting fixture in the networked lighting group.

33. The method of claim 15, wherein the network coordinator is a ZigBee coordinator and each of the plurality of lighting fixtures includes a ZigBee transceiver, communications between the plurality of lighting fixtures and the network coordinator comprising ZigBee wireless communications.

34. The method of claim 15, wherein the step of receiving, at the network coordinator, the respective wireless messages, is in response to a user input.

35. The method of claim 34, wherein the user input is a wireless message sent from an application running on a remote device.

36. The method of claim 15, wherein determining whether said illuminated lighting element is located within the area comprises a user input to the network coordinator.

37. The method of claim 36, wherein the user input comprises a button press, the button associated with a room controller or an entry station.

38. The method of claim 15, further comprising:
providing a light pulse to a lighting sensing element of an additional lighting fixture located within the area;
sending, from the additional lighting fixture, a wireless message including an identifier associated with the respective lighting fixture;
receiving, at the network coordinator, the wireless message from the additional lighting fixture; and
adding, by the network coordinator, the additional lighting fixture to the networked lighting group.

39. The method of claim 37, wherein the sending step is in response to the light pulse in addition to a registration of motion in the area by an occupancy sensing element associated with the additional lighting fixture.

40. The method of claim 15, wherein after determining the highest ranked one is located within the area, activating an automated grouping process comprising:
sending, from the network coordinator, a wireless message to the highest ranked one to turn off its associated lighting element;
sending, from the network coordinator, a wireless message to a next lighting fixture, the wireless message instructing the next lighting fixture to illuminate an associated lighting element;
determining whether said illuminated lighting element is located within the area by monitoring one or more light sensing elements in the one or more lighting fixtures in the networked lighting group for an increase in ambient light level in the area; and
keeping the next lighting fixture in the networked lighting group if said illuminated lighting element is determined to be located within the area, or removing the next lighting fixture from said networked lighting group if said illuminated lighting element is determined not to be located within the area.

41. The method of claim 40, wherein when the one or more of the plurality of lighting fixtures in the networked lighting group senses an increase in ambient light level, the one or more of the plurality of lighting fixtures in the networked lighting group transmits a wireless message to the network coordinator to confirm that the next lighting fixture is in the area.

42. The method of claim 40, wherein when the one or more of the plurality of lighting fixtures in the networked lighting group does not senses an increase in ambient light level, the one or more of the plurality of lighting fixtures in the networked lighting group does not transmit a wireless message to the network coordinator.

43. The method of claim 42, wherein when the network coordinator does not receive a wireless message for a predetermined period of time, the network coordinator removes the next lighting fixture from said networked lighting group.

44. The method of claim 40, wherein when the one or more of the plurality of lighting fixtures in the networked lighting group does not senses an increase in ambient light level, the one or more of the plurality of lighting fixtures in the networked lighting group transmits a wireless message to the network coordinator to confirm that the next lighting fixture is not in the area.

45. The method of claim 40, wherein the automated grouping process is repeated, as necessary, until all of the plurality of lighting fixtures in the area are identified and included in the networked lighting group.

46. The method of claim 45, wherein at the conclusion of the automated grouping process, the network coordinator transmits a wireless message to all of the lighting fixtures in the network lighting group to illuminate their light elements in unison.

47. The method of claim 40, wherein the automated grouping process is activated by one of a user activated push button, a key press, or a data entry feature on an entry station or via a remote device.

* * * * *